US012760167B2

(12) United States Patent
Manabe et al.

(10) Patent No.: US 12,760,167 B2
(45) Date of Patent: Oct. 13, 2026

(54) BIAXIALLY ORIENTED POLYESTER FILM AND PRODUCTION METHOD THEREFOR

(71) Applicant: TOYOBO CO., LTD., Osaka (JP)

(72) Inventors: Nobuyuki Manabe, Inuyama (JP); Takamichi Goto, Inuyama (JP); Masayuki Haruta, Inuyama (JP)

(73) Assignee: TOYOBO CO., LTD., Osaka (JP)

( * ) Notice: Subject to any disclaimer, the term of this patent is extended or adjusted under 35 U.S.C. 154(b) by 558 days.

(21) Appl. No.: 18/558,588

(22) PCT Filed: May 27, 2022

(86) PCT No.: PCT/JP2022/021771

§ 371 (c)(1),
(2) Date: Nov. 2, 2023

(87) PCT Pub. No.: WO2022/255257

PCT Pub. Date: Dec. 8, 2022

(65) Prior Publication Data

US 2024/0218148 A1 Jul. 4, 2024

(30) Foreign Application Priority Data

Jun. 2, 2021 (JP) ................................ 2021-092737
Aug. 10, 2021 (JP) ................................ 2021-130593

(51) Int. Cl.
*C08J 11/12* (2006.01)
*B29C 48/00* (2019.01)
(Continued)

(52) U.S. Cl.
CPC ........... *C08J 11/12* (2013.01); *B29C 48/0018* (2019.02); *B29C 48/08* (2019.02); *B29C 48/305* (2019.02);
(Continued)

(58) Field of Classification Search
CPC .......... C08J 11/12; C08J 5/18; C08J 2333/04; C08J 2367/02; C08J 2467/02;
(Continued)

(56) References Cited

U.S. PATENT DOCUMENTS

2015/0259484 A1* 9/2015 Nakano ..................... C08J 5/18
521/48
2022/0056223 A1 2/2022 Haruta et al.

FOREIGN PATENT DOCUMENTS

EP 2868688 A1 5/2015
JP 6036099 B2 11/2016
(Continued)

OTHER PUBLICATIONS

Machine translation of JP 2018203818 by Takagi. (Year: 2018).*
(Continued)

*Primary Examiner* — Christina H. W. Rosebach
(74) *Attorney, Agent, or Firm* — Leydig, Voit & Mayer, Ltd.

(57) ABSTRACT

The invention provides a biaxially oriented polyester film that is formed of a polyester resin composition containing polyester resin employing recycled PET bottles and particles, and meets all of requirements (1) to (4): (1) crystallization temperature is 120-139° C., (2) amount of change in orientation angle with respect to the film transverse direction is 0-10° per 0.5 m, (3) heat shrinkage rate at 150° C. for 30 minutes is 0.5-2.0% in the machine direction and −1.0-1.0% in the transverse direction, and (4) content rate of an isophthalic acid component with respect to 100 mol % of total dicarboxylic acid components in the polyester resin composition is 0.01-3.0 mol %. Maximum and minimum values of data for each measurement position are within the range in the requirement (3), and a maximum value of each
(Continued)

amount of change between two adjacent sample collection positions is within the range in the requirement (2).

4 Claims, 1 Drawing Sheet

(51) Int. Cl.

| | |
|---|---|
| ***B29C 48/08*** | (2019.01) |
| ***B29C 48/305*** | (2019.01) |
| ***B29C 48/88*** | (2019.01) |
| ***B29C 55/12*** | (2006.01) |
| ***B29C 55/14*** | (2006.01) |
| ***B29C 71/02*** | (2006.01) |
| ***B29D 7/01*** | (2006.01) |
| ***C08J 5/18*** | (2006.01) |
| ***C08L 67/02*** | (2006.01) |
| *B29C 48/49* | (2019.01) |
| *B29K 67/00* | (2006.01) |
| *B29L 7/00* | (2006.01) |

(52) U.S. Cl.
CPC ............ *B29C 48/914* (2019.02); *B29C 55/12* (2013.01); *B29C 55/14* (2013.01); *B29C 71/02* (2013.01); *B29D 7/01* (2013.01); *C08J 5/18* (2013.01); *C08L 67/02* (2013.01); *B29C 48/49* (2019.02); *B29C 2071/022* (2013.01); *B29C 2071/025* (2013.01); *B29K 2067/00* (2013.01); *B29L 2007/00* (2013.01); *C08J 2333/04* (2013.01); *C08J 2367/02* (2013.01); *C08J 2467/02* (2013.01); *Y02W 30/62* (2015.05)

(58) Field of Classification Search
CPC ................ B29C 48/0018; B29C 48/08; B29C 48/305; B29C 48/914; B29C 55/12; B29C 55/14; B29C 71/02; B29C 48/49; B29C 2071/022; B29C 2071/025; B29D 7/01; C08L 67/02; B29K 2067/00; B29L 2007/00; Y02W 30/62; C08K 3/36
See application file for complete search history.

(56) References Cited

FOREIGN PATENT DOCUMENTS

| | | | |
|---|---|---|---|
| JP | 6070842 | B2 | 2/2017 |
| JP | 2018-203818 | A | 12/2018 |
| JP | 6500629 | B2 | 4/2019 |
| JP | 6610617 | B2 | 11/2019 |
| KR | 10-2015-0017778 | A | 2/2015 |
| WO | WO 2020/166353 | A1 | 8/2020 |

OTHER PUBLICATIONS

Translation of JP 6610617 by Nakatani et al. (Year: 2019).*
Machine translation of JP 6500629 by Ikehata (Year: 2019).*
Japan Patent Office, International Search Report in International Patent Application No. PCT/JP2022/021771 (Aug. 2, 2022).
Japan Patent Office, Written Opinion of the International Searching Authority in International Patent Application No. PCT/JP2022/021771 (Aug. 2, 2022).
Korean Intellectual Property Office, Office Action in Korean Patent Application No. 10-2023-7040187 (Feb. 3, 2026).
Damayanti et al., "Strategic Possibility Routes of Recycled PET," Polymers, 13(9): 1475 (2021).
European Patent Office, Extended European Search Report in European Patent Application No. 22816007.3 (Apr. 10, 2025).

* cited by examiner

BIAXIALLY ORIENTED POLYESTER FILM AND PRODUCTION METHOD THEREFOR

TECHNICAL FIELD

The present invention relates to a biaxially oriented polyester film and a production method therefor. Specifically, the present invention relates to a biaxially oriented polyester film, which is suitable for various processing applications as there are little variations and distortion in molecular orientation property and heat shrinkage rate in the film transverse direction and the physical properties in the film transverse direction are uniform and is environmentally friendly as polyester resin recycled from the market and society, including PET bottles (hereinafter, referred to as "polyester resin employing recycled PET bottles" in some cases) is used, and a production method therefor.

BACKGROUND ART

Polyethylene terephthalate (PET), polybutylene terephthalate (PBT), and other such polyester resins that are thermoplastic resins which excel in heat-resistance and mechanical properties are employed in extremely diverse fields which include plastic films, electronics, energy, packaging materials, automotive, and so forth. Among plastic films, biaxially oriented polyester films are excellent in balance between the cost and the mechanical characteristics and strength, heat resistance, dimensional stability, chemical resistance, optical characteristics, and so forth, and are thus widely employed in industrial and packaging fields.

In recent years, with the growing demand for the construction of a sound material-cycle society, the utilization of recycled raw materials has been promoted in the material field as well. In the polyester resins mentioned above as well, used beverage PET bottles are also recycled, and their utilization methods are attracting attention.

It is said that the use of recycled PET bottles raw materials leads to $CO_2$ reduction, and there is a desire to increase the usage ratio of recycled PET bottle raw materials from the perspective of the global environment as well.

In recent years, in secondary processing steps such as coating, printing, and vapor deposition of polyester films, speeding up and increases in width and length of the film serving as a substrate have been promoted in order to improve productivity. In particular, in a case where the film width is increased, the effects of heat and tension during processing become greater, thus it is difficult to acquire uniform physical properties in the transverse direction, and it is difficult to obtain biaxially oriented polyester films suitable for various processing applications. In particular, it is required to reduce variations and distortion in molecular orientation property and heat shrinkage rate in the film transverse direction.

For example, Patent Document 1 discloses a biaxially oriented polyethylene terephthalate film employing recycled PET bottle raw materials.

Such art makes it possible to obtain a biaxially oriented polyester film in which there is little residue from liquid detergent components employed during manufacture of the PET bottle reconstituted raw material, thermal stability is excellent, there is little foreign matter, resistivity when molten is also stable, and there is no impairment of film productivity or grade.

Although a biaxially oriented polyethylene terephthalate film employing recycled PET bottle raw materials and an alkaline cleaning method for obtaining a film that is excellent in thermal stability and contains few foreign substances are mentioned, there is no mention of variations and distortion in molecular orientation property and heat shrinkage rate in the film transverse direction. In order to obtain a biaxially oriented polyethylene terephthalate film employing recycled PET bottle raw materials, a method is proposed in which an unstretched sheet obtained by mixing a recycled PET bottle raw material and fossil fuel-derived polyester resin and melt-extruding the mixture is heated to 100° C. using heated rolls and an infrared heater, stretched 4.0 times in the machine direction using the rolls, then stretched 4.2 times in the transverse direction at 130° C., and then subjected to heat setting treatment and thermal relaxation treatment.

However, polyester resin employing recycled PET bottles is polyester resin that is recycled from commonly collected used PET bottles through steps such as pulverization, washing to remove foreign substances, and decontamination through high-temperature treatment, the crystallization temperature when heated thereof is usually about 130° C., which is lower than the crystallization temperature when heated of polyester resin derived from fossil fuels, and it has been thus found by the inventors that the polyester resin is likely to fracture during stretching at stretching temperatures higher than 130° C. Meanwhile, if the stretching temperature is lowered in order to suppress fracture during stretching, a difference in stretching stress in the machine direction generated by stretching in the transverse direction is likely to occur between the ends held by clips and the central portion where the constraint force is relatively small, the bowing phenomenon caused by non-uniformity of physical properties in the film transverse direction occurs, and variations and distortion in molecular orientation property and heat shrinkage rate in the film transverse direction are likely to occur, and sufficient consideration has not been given to the problems.

When viewed geometrically, the bowing phenomenon means that a straight line drawn in the transverse direction of the film at the entrance of the tenter changes to an arched curve with the central portion of the film delayed at the exit of the tenter. In the resulting biaxially oriented polyester film, the main axis of molecular chain orientation tilts from the central portion toward the ends, and as a result, variations and distortion occur in the transverse direction in terms of heat shrinkage rate characteristics and the like, and this is considered to be caused by differences in the effects of stretching stress in the film machine direction, shrinkage stress in the machine direction generated during the heat setting step, and tension generated within the tenter.

Until now, various measures for reducing the bowing phenomenon have been studied. For example, in Patent Document 2, as a method of appropriately combining film forming conditions such as stretching conditions in the machine direction and transverse direction, heat setting conditions, and thermal relaxation conditions, a method is proposed in which heating is performed by setting the film temperature at both ends of an unstretched sheet to be higher than that at the central portion by +3° C. using an infrared heater, two stage stretching (total stretching ratio: 4.0 times) consisting of the first stage stretching by 1.4 times and the second stage stretching by 2.86 times at a stretching temperature of 115° C. is performed, then stretching in the transverse direction is performed at a stretching temperature of 115° C. and a stretching ratio of 4.3 times, heat setting is performed at 235° C., and 5% thermal relaxation treatment in the transverse direction is performed to reduce the differences in physical properties in the film transverse direction. In order to reduce the differences in physical properties in the film transverse direction, a method is adopted in which multistage stretching in the machine direction is performed between a plurality of rolls, but the production equipment is large-scale, which is disadvantageous in terms of production cost, abrasion with the rolls is likely to occur, and the quality of the biaxially oriented polyester film may be impaired in some cases, and sufficient consideration has not been given to the problems. A polyester film has not yet been realized which is suitable for various processing applications as there are little variations and distortion in molecular orientation property and heat shrinkage rate in the film transverse direction and the physical properties in the film transverse direction are uniform and is environmentally friendly as polyester resin employing recycled PET bottles is used.

According to the studies conducted by the present inventors, it has been found that the effect of sufficiently reducing the bowing phenomenon is not acquired when the production conditions described in Patent Document 2 are simply applied to produce the film described in Patent Document 1.

PRIOR ART DOCUMENT

Patent Documents

Patent Document 1: JP-B2-6036099
Patent Document 2: JP-B2-6070842

SUMMARY OF THE INVENTION

Problem to be Solved by the Invention

An object of the present invention is to improve the problems of the prior art, and to provide a biaxially oriented polyester film that is suitable for various processing applications and is environmentally friendly as polyester resin employing recycled PET bottles is used as well as there are little variations and distortion in molecular orientation property and heat shrinkage rate in the film transverse direction and the physical properties in the film transverse direction are uniform, and a production method therefor.

Means for Solving the Problem

As a result of intensive studies by the present inventors, it has been found that in a biaxially oriented polyester film obtained by biaxially stretching a polyester resin composition in which polyester resin containing particles is blended with polyester resin employing recycled PET bottles, by performing stretching in the machine direction and then stretching in the transverse direction in a tenter, providing a cooling region before the heat setting treatment region, and performing heat setting treatment and thermal relaxation treatment in the step of heating and biaxially stretching a melt-extruded unstretched sheet, it is possible to obtain a biaxially oriented polyester film that is suitable for various processing applications and is environmentally friendly as polyester resin employing recycled PET bottles is used as well as there are little variations and distortion in molecular orientation property and heat shrinkage rate in the film transverse direction and the physical properties in the film transverse direction are uniform.

That is, the present invention is constituted as follows.

1. A biaxially oriented polyester film comprising a polyester resin composition containing polyester resin employing recycled PET bottles and particles, wherein the biaxially oriented polyester film meets all of requirements (1) to (4) below:
   (1) a crystallization temperature when heated that is measured using a differential scanning calorimeter (DSC) is 120° C. or more and 139° C. or less;
   (2) an amount of change in orientation angle with respect to a film transverse direction is 0° or more and 10° or less per 0.5 m;
   (3) a heat shrinkage rate when heat treatment at 150° C. for 30 minutes is performed over an entire width of the film is in a range of 0.5% or more and 2.0% or less in a machine direction and in a range of −1.0% or more and 1.0% or less in a transverse direction; and
   (4) a content rate of an isophthalic acid component with respect to 100 mol % of total dicarboxylic acid components in the polyester resin composition is 0.01 mol % or more and 3.0 mol % or less.

Here, sample collection positions in the requirements (2) and (3) are a center position with respect to the entire width and positions at intervals of 500 mm from the center position toward both ends, and are end positions where collection is possible in a case where intervals of 500 mm cannot be secured near both ends.

It is required that maximum and minimum values of data for each measurement position is within the range in the requirement (3) and a maximum value of each amount of change between two adjacent sample collection positions is within the range in the requirement (2).

2. The biaxially oriented polyester film according to 1., wherein a content rate of the polyester resin employing recycled PET bottles in the polyester resin composition making up the biaxially oriented polyester film is 50 masse or more and 100 mass % or less.
3. The biaxially oriented polyester film according to 1. or 2., wherein the polyester resin employing recycled PET bottles is mechanically recycled polyester resin and/or chemically recycled polyester resin.
4. A production method for the biaxially oriented polyester film according to any one of 1. to 3., the method comprising a polyester raw resin melt extrusion step, a biaxial stretching step, a heat setting treatment step, a thermal relaxation treatment step, and a step of winding a biaxially oriented polyester film into a roll, wherein stretching in a machine direction is performed, then stretching in a transverse direction is performed in a tenter, and a cooling region is provided before a heat setting treatment region in the biaxial stretching step.

Effect of the Invention

According to the present invention, it is possible to provide a polyester film that is suitable for various processing applications and is environmentally friendly as polyester resin employing recycled PET bottles is used as well as there are little variations and distortion in molecular orientation property and heat shrinkage rate in the film transverse direction and the physical properties in the film transverse direction are uniform, and a production method therefor.

MODE FOR CARRYING OUT THE INVENTION

Figure 1:
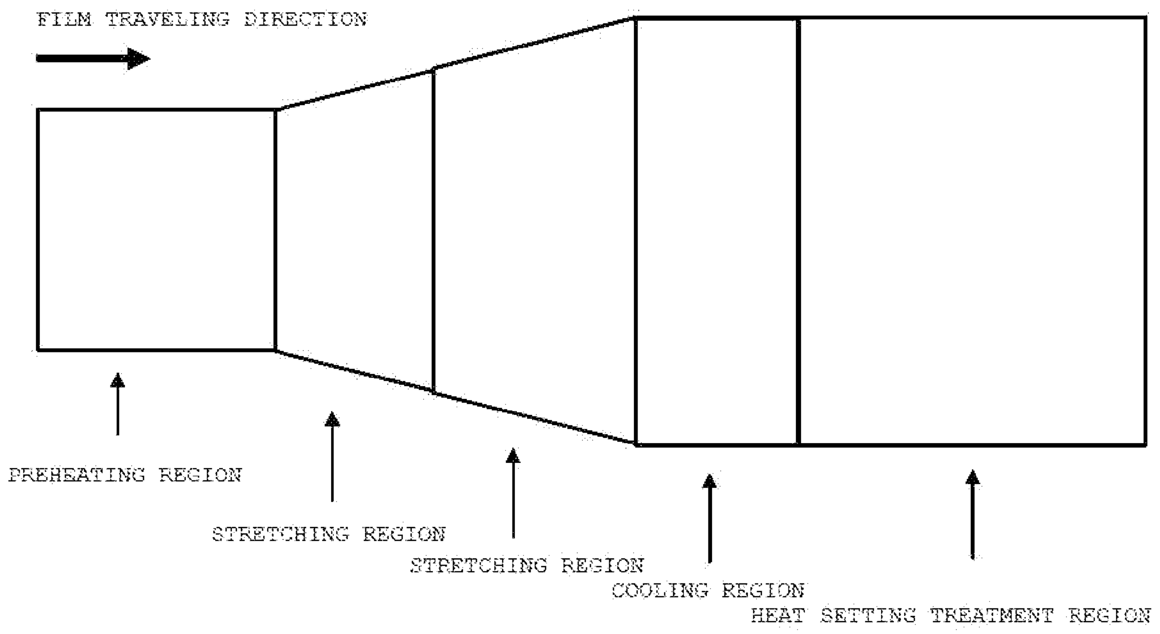
FIG. 1 is a plan view for explaining an example of a biaxial stretching step (tenter device) and a heat setting treatment step for producing a biaxially oriented polyester film of the present invention.
Figure 2:
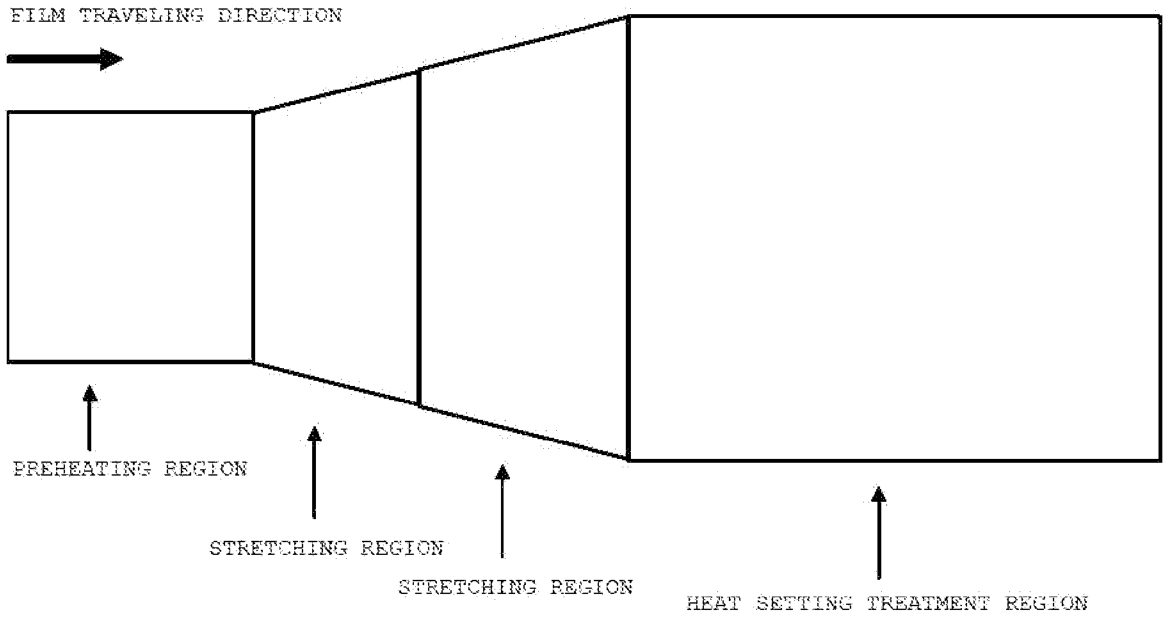
FIG. 2 is a plan view for explaining a biaxial stretching step (tenter device) and a heat setting treatment step in Comparative Example 2.

The present invention is described in detail below.

Polyester Resin Employing Recycled Pet Bottles

In the biaxially oriented polyester film according to the present invention, it is preferable to use the following polyester resin employing recycled PET bottles. By using polyester resin employing recycled PET bottles, it is possible to increase the ratio of recycled raw materials in the film and obtain an environmentally friendly film.

As polyester resin employing recycled PET bottles in accordance with the present invention, polyester resins (hereinafter sometimes referred to as "mechanically recycled polyester resins") obtained by physical reconstitution methods in which used PET bottles recovered by the market and/or society are separated, pulverized, and cleaned, and, following adequate removal of surface grime and foreign matter, are exposed to high temperature, and following intensive cleaning carried out with respect to contaminants and the like which remain at the interior of the resin, are repelletized, and/or polyester resins (hereinafter sometimes referred to as "chemically recycled polyester resins") obtained by causing polyester resin contained within used container packaging to be made to decompose to the monomer level, thereafter removing contaminants and the like therefrom, and carrying out repolymerization thereof, may be favorably employed.

The polyester resin employing recycled PET bottles, which may be employed in the biaxially oriented polyester film in accordance with the present invention is made up primarily of recycled containers that are made up primarily of polyethylene terephthalate; for example, recycled containers for tea drinks, soft drinks, and other such beverages may be favorably employed, it being possible for these to be oriented as appropriate, and while it is preferred that these be colorless, presence of some colorant component is possible.

Reconstituted raw material recycled from the market and/or society and including PET bottles that may be favorably employed is polyester formed as a result of manufacture by means of ordinary polymerization or solid-state polymerization, it being preferred that this be made up primarily of polyethylene terephthalate, there being no objection where this is made to also contain other polyester component(s) and/or copolymerized component(s). This may also be made to contain catalyst(s) in the form of antimony, germanium, titanium, and/or other such metal compounds, and/or stabilizer(s) in the form of phosphorous compound(s) and/or the like. It is often the case that polyester for PET bottles will ordinarily employ catalyst in the form of germanium, and where PET bottle reconstituted raw material is employed and this is made into a film, it will be the case that germanium will be present within the film in an amount that is 1 ppm or higher. However, it must be remembered that because this is the catalyst content thereof, it is ordinarily the case that this is not greater than 100 ppm at most, and is usually not greater than 50 ppm.

Below, description is given with respect to mechanically recycled polyester resins and chemically recycled polyester resins.

Mechanically Recycled Polyester Resins

After used recycled PET bottles that have been gathered together are separated so as to prevent admixture by trash and other materials, and labels and the like have been removed therefrom, these are pulverized and made into flakes. It is often the case that foreign matter adheres to and is mixed within such flakes. Furthermore, one can also imagine situations in which PET bottles used by consumers were filled with reagents, solvents, and/or other such chemical substances and used. For example, one can imagine that there might be detergents for kitchen utensils or the like, pesticides, herbicides, or agricultural chemicals, or any of various types of oils or the like. Because chemical substances adhering to surfaces of PET bottles cannot be adequately removed by ordinary cleaning, it is preferred that alkali cleaning be carried out. As alkali metal hydroxide solution for use during such a cleaning operation, sodium hydroxide solution or potassium hydroxide solution is used. At such a cleaning operation, precleaning may be carried out before carrying out alkali cleaning.

If alkali cleaning is not carried out, because there will be foreign matter that remains within the resin raw material, not only will admixture thereof serve as cause for occurrence of breakage during film formation, lowering productivity, but it will also be the case that foreign matter will remain within the film, and may affect film external appearance or cause occurrence of printing voids during any printing operation that follows.

While concentration of an aqueous alkali metal hydroxide solution used at the foregoing cleaning operation will vary depending on temperature, time, and the situation with respect to agitation, this is ordinarily within the range 1 wt % to 10 wt %. Furthermore, the time required for cleaning is within the range 10 minutes to 100 minutes, it being preferred to increase effect that this be carried out while agitating.

Following alkali cleaning, it is preferred that rinsing/cleaning and drying be carried out. Alkali cleaning and/or rinsing/cleaning may be repeated multiple times. Where a component of the aqueous alkali metal hydroxide solution used for cleaning at the alkali cleaning operation remains in the flakes, there are cases in which, by way of melt extrusion operation(s) carried out at the pellet granulation operation thereafter and/or melt extrusion operation(s) carried out during film formation, this can have an effect on the physical properties of the film that is ultimately obtained.

It is preferred that the concentrations of sodium and potassium within the film that is ultimately obtained through use of such polyester resins employing recycled PET bottles be greater than 0 ppm but not greater than 150 ppm, more preferred that this be 3 ppm to 120 ppm, and still more preferred that this be 5 ppm to 80 ppm. Because there may be lowering of heat resistance and/or thermal stability, and/or discoloration, when concentration(s) of sodium and/or potassium present within the film are greater than 150 ppm, this is not preferred. Furthermore, were there to be absolutely none whatsoever thereof, because there would be diminution of the effect whereby generation of diethylene glycol is suppressed and so forth, this is not preferred. Furthermore, as there are situations in which polyester resins employing recycled PET bottles contain small amounts of such components, complete elimination thereof would be difficult.

At such a cleaning operation, the aqueous alkali metal hydroxide solution causes a portion of the PET bottle flakes to undergo hydrolysis. Furthermore, heating during forming of PET bottles causes reduction in the degree of polymerization of the resin. Moreover, application of heat and moisture during remelting and pelletization following pulverization so as to permit reuse of recovered PET bottles can have the effect of lowering the degree of polymerization. Although it is possible to reuse these as is, depending on the use to which they will be put, inasmuch as reduction in the degree of polymerization may cause formability, strength, transparency, heat resistance, and/or the like to become inferior, there are cases in which these cannot be reused as is.

In such situations, to cause recuperation of the degree of polymerization where this has been lowered, it is preferred that PET bottle flakes obtained as a result of pulverization and cleaning, or that which results when flakes have been melted and pelletized, be made to undergo solid-state polymerization.

At the solid-state polymerization operation, this may be carried out by causing flakes obtained as a result of cleaning, or that which results when flakes have been melt extruded and pelletized, to undergo continuous solid-state polymerization in nitrogen gas, rare gas(es), or other such inert gas(es) at 180° to 245° C., or more preferably 200° to 240° C.

It is desirable that this be carried out such that flake or pellet conditions are adjusted so that conditions at the polyester resin employing recycled PET bottles ultimately are such that intrinsic viscosity is 0.55 dl/g to 0.90 dl/g, or more preferably 0.60 dl/g to 0.85 dl/g.

Description will be given with respect to the operation in which flakes are pelletized. An extruder having degassing means and filtration means is used to melt, extrude, cool, and granulate flakes.

During the melt operation at the extruder, this may be carried out by performing melt kneading at ordinarily 260° to 300° C., or more preferably 265° to 295° C. It is necessary that the flakes obtained as a result of pulverization of PET bottles which are fed thereinto be adequately dried, drying being carried out at conditions such that this is 5 to 200, or preferably 10 ppm to 100 ppm, or more preferably 15 ppm to 50 ppm. Where flake moisture content is high, this will cause the hydrolysis reaction to proceed at the melt operation, lowering the intrinsic viscosity of the polyester resin that is obtained. As degassing means, it is preferred that a vacuum vent be present at least one location within the resin melt zone.

Furthermore, it is preferred that said extruder be such that filtration means thereat have a filter capable of filtering and removing solid foreign matter from the molten resin for which particle diameter is 25 μm or greater, preferably 15 μm or greater, and more preferably 10 μm or greater.

Molten resin that has passed through the filter travels by way of dice and is cooled in water, following which it is granulated as a result of being cut into pellets of desired shape.

Chemically Recycled Polyester Resins

While there is no particular limitation with respect to the method of manufacturing chemically recycled polyester resins that may be employed in accordance with the present invention, these include, e.g., to give a specific example as described at JP-A-2000-169623, those in which following separation, pulverization, and cleaning of recovered used PET bottles to remove foreign matter therefrom, that which is obtained by causing decomposition and purification to proceed as far as PET resin raw material or intermediate raw material as a result of causing depolymerization thereof is polymerized to cause this to become new PET resin. Methods in which depolymerization is such that ethylene glycol (EG) is added, and, in the presence of a catalyst, this is made to return to as far as bis-2-hydroxyethyl terephthalate (BHET) which is an intermediate raw material during resin manufacture, and following purification thereof this is repolymerized to PET, and methods in which, as described at JP-A-2000-302707, repolymerization is carried out following production of terephthalic acid and ethylene glycol as a result of heat treatment in a nonaqueous organic solvent in the presence of a catalyst in which iron is an essential component and polyethylene terephthalate is oxidized, may be cited as examples.

Because it is characteristic of chemically recycled polyester resins that whereas foreign matter and foreign substances are removed between depolymerization and repolymerization, and reconstitution thereof into a polyester resin that is of high quality equivalent in grade to that of virgin resin is permitted thereby, and because the hygienic properties thereof are superior to those of the aforementioned mechanically recycled polyester resins, these may in particular be favorably used in food packaging applications.

Bales of used PET bottles that have been compressed and reduced in volume serve as starting material for chemically recycled polyester resins used in accordance with the present invention. Such bales of PET bottles may be manufactured in accordance with known methods currently being utilized by municipalities. Other polyethylene terephthalate waste material or PET bottle flakes may serve instead of bales of PET bottles as a starting material Bales of PET bottles obtained as a result of compression and reduction in volume of PET bottle waste material are fed into a grinder, warm water or water of normal temperature, or warm water or water of normal temperature which contains detergent, is injected thereinto, and pulverization is carried out in water.

Next, the mixture of liquid detergent and PET bottle flakes that is discharged from the grinder is immediately thereafter made to undergo processing for separation based on specific gravity, as a result of which metal, stone, glass, sand, and flakes are separated therefrom. Next, the flakes and liquid detergent are separated, and the flakes are washed with deionized water and made to undergo centrifugal dewatering.

The crude polyethylene terephthalate flakes obtained from the foregoing pretreatment operation are depolymerized and melted, and are simultaneously hydrolyzed and made into a polyethylene terephthalate melt having a low degree of polymerization, and an excess amount of ethylene glycol is used to carry out depolymerization to obtain a two-species solution containing a mixture of crude BHET and crude ethylene glycol.

Following completion of the depolymerization reaction, the temperature of the two-species solution containing the mixture of crude BHET and crude ethylene glycol is decreased, and this is filtered to remove high-melting-point sediment in the form of unreacted linear and cyclic oligomers, coagulated residue of foreign plastics other than polyethylene terephthalate, metal, and other such solid foreign matter, and this is then made to undergo adsorption/ion exchange treatment, removal of dissolved ions and colored substances being carried out to remove any foreign matter present within the crude BHET.

The two-species solution containing the mixture of crude BHET and crude ethylene glycol obtained by way of the foregoing prepurification operation is made to undergo a distillation/vaporization procedure, causing the ethylene glycol to be separated and distilled therefrom, to obtain concentrated BHET, or the two-species solution containing the mixture is cooled to 10° C. or lower to cause crystallization of BHET, following which the ethylene glycol and BHET are subjected to solid-liquid separation to obtain concentrated BHET, this concentrated BHET being subjected to vacuum evaporation such that temperature is above 190° C. but not greater than 250° C. and such that residence time of the concentrated BHET within the evaporator is not greater than 10 minutes, to obtain purified bis-β-hydroxyethyl terephthalate.

After the foregoing has been carried out and purified BHET of high purity has been obtained, this purified BHET is loaded into a melt polycondensation reaction vessel to obtain polyethylene terephthalate polymer of high purity.

Polyester Resin Composition

A biaxially oriented polyester film in accordance with the present invention comprises a polyester resin composition that contains the following polyester resin(s) as primary constituent thereof.

The polyester resin that makes up a biaxially oriented polyester film in accordance with the present invention is a polymer that may be synthesized from dicarboxylic acid or an ester-forming derivative thereof, and a diol or an ester-forming derivative thereof. Polyethylene terephthalate, polybutylene terephthalate, polyethylene-2,6-naphthalate may be cited as examples, polyethylene terephthalate being preferred from the standpoints of mechanical properties, heat resistance, cost, and so forth.

Where “primary constituent” is said here, this means that fractional content within the polyester resin composition is not less than 80 wt %, preferably that this is not less than 90 wt %, more preferably that this is not less than 95 wt %, and most preferably that this is not less than 98 wt %.

Furthermore, so long as it does not impair the object of the present invention, other component(s) may be copolymerized within such polyester resin(s). More specifically, as copolymerized components, dicarboxylic acid components that may be cited as examples thereof include isophthalic acid, naphthalene dicarboxylic acid, 4,4-biphenyldicarboxylic acid, adipic acid, sebacic acid, ester-forming derivatives thereof, and so forth. Furthermore, diol components that may be cited as examples thereof include diethylene glycol, hexamethylene glycol, neopentyl glycol, and cyclohexanedimethanol. Furthermore, polyethylene glycol, polypropylene glycol, and other such polyoxyalkylene glycols may also be cited as examples. It is preferred that the copolymerized amount thereof be within 10 mole of the repeating units of which this is made up, more preferred that this be within 5 mol %, and most preferred that this be not greater than 3 mol %.

Among the polyester resins that may make up biaxially oriented polyester films in accordance with the present invention, besides mechanically recycled polyester resins and chemically recycled polyester resins, as methods for manufacturing polyester resins derived from fossil fuels, methods in which the aforementioned dicarboxylic acid or an ester-forming derivative thereof and a diol or an ester-forming derivative thereof serving as primary starting materials are first, in accordance with ordinary methods, made to undergo an esterification and/or transesterification reaction, following which this is further made to undergo a polycondensation reaction under high temperature/vacuum conditions to carry out manufacture thereof, and so forth may be cited as examples.

From the standpoints of film formability, recoverability, and so forth, it is preferred that intrinsic viscosity of polyester resin making up a biaxially oriented polyester film in accordance with the present invention be within the range 0.50 dl/g to 0.90 dl/g, and it is more preferred that this be within the range 0.55 dl/g to 0.80 dl/g.

It is preferred that the polyester resin composition of the present invention contain at least one type of particle selected from the group consisting of inorganic particles, organic particles, and particles consisting of a mixture thereof.

As inorganic particles that may be used, particles consisting of silica (silicon oxide), alumina (aluminum oxide), titanium dioxide, calcium carbonate, kaolin, crystalline glass filler, kaolin, talc, alumina, silica-alumina composite oxide particles, and barium sulfate may be cited as examples. As organic particles, acrylic resin particles, melamine resin particles, silicone resin particles, particles consisting of crosslinked polystyrene may be cited as examples. Thereamong, particles consisting of silica (silicon oxide), calcium carbonate, and/or alumina (aluminum oxide), or particles consisting of polymethacrylate, polymethyl acrylate, and/or derivative(s) thereof, are preferred, and particles consisting of silica (silicon oxide) and/or calcium carbonate are more preferred, thereamong silica (silicon oxide) being particularly preferred due to the fact that it will cause haze to be reduced.

Weight average particle diameter of particles in the context of the present invention is the value as measured using a Coul counter. It is preferred that the weight average particle diameter of particles be 0.5 μm to 4.0 μm, more preferred that this be 0.8 μm to 3.8 μm, and still more preferred that this be 1.5 μm to 3.0 μm.

When the weight average particle diameter of the particles is below 0.5 μm, formation of surface irregularities will be insufficient, there will be a tendency for lubricity of the film to be reduced and for purging of air entrained therebetween when this is being wound up into a roll to be nonuniform, causing occurrence of poor external appearance in the form of wrinkling and pock marks over bubbles, and there will be a tendency for ability to be wound up into a roll to deteriorate.

When the weight average particle diameter of the particles exceeds 4.0 μm, there will be a tendency for quality of the film to be impaired inasmuch as there will be occurrence of printing defects and so forth due to formation of coarse projections.

Furthermore, so long as it does not impair the object of the present invention, a polyester resin composition in accordance with the present invention may contain small amount(s) of other polymer(s), antioxidant(s), thermal stabilizer(s), antistatic agent(s), ultraviolet light absorber(s), plasticizer(s), pigment(s), other additive(s), and/or the like.

It is preferred that the biaxially oriented polyester film obtained as described above contain an isophthalic acid component in a content rate range of 0.01 mol % or more and 3.0 mol % or less with respect to 100 mol % of the total dicarboxylic acid components in the film. Among the polyesters generally employed in PET bottles are those in which control of crystallinity is carried out for the purpose of causing external appearance of the bottle to be satisfactory, one means for achieving this being the use of polyester containing not greater than 10 mol % of isophthalic acid component.

For this reason, the biaxially oriented polyester film of the present invention contains a material containing an isophthalic acid component in a certain amount.

It is preferred that the lower limit of the range in values for the amount of isophthalic acid component as a fraction of the entire dicarboxylic acid component that makes up the polyester resin contained within the film be 0.01 mol %, it being more preferred that this be 0.05 mol %, still more preferred that this be 0.1 mol %, and particularly preferred that this be 0.15 mol %. Because, as has already been mentioned, there are cases in which polyester resin recycled by the market and/or society and including PET bottles will contain a large isophthalic acid component, requiring the isophthalic acid component that makes up the polyester resin within the film to be less than 0.01 mol % is not so preferred, because it would have the effect of making manufacture of polyester film, present within recycled resin in a large fractional amount, difficult. It is preferred that the upper limit of the amount of isophthalic acid component in the total dicarboxylic acid components that make up the polyester resin contained within the film be 3.0 mol %, it being more preferred that this be 2.5 mol %, and still more preferred that this be 2.0 mol %. Above 3.0 mol % is not so preferred, because there would be cases in which the reduction in crystallinity that would result would cause the mechanical strength of the film to be reduced.

It is preferred that the upper limit of the intrinsic viscosity of the polyester resin employing recycled PET bottles be 0.90 dl/g, more preferred that this be 0.80 dl/g, still more preferred that this be 0.75 dl/g, and particularly preferred that this be 0.69 dl/g. Above 0.90 dl/g is not so preferred, as it would cause there to be situations in which the resin would not be easily discharged from the extruder, and productivity would be lowered.

It is preferred that in the biaxially oriented polyester film in accordance with the present invention, the lower limit of the content rate of polyester resin employing recycled PET bottles with respect to the total amount of polyester resin making up the film be 50 wt %, more preferred that this be 70 wt %, still more preferred that this be 90 mass %, and particularly preferred that this be 100 wt %. From the standpoint of ability to contribute to preservation of the environment, below 50 wt % is not so preferred, because this would cause fractional content to be too low to permit utilization as recycled resin. Polyester resin employing recycled PET bottles may be used as a master batch (a resin contained at a high concentration) employed when a lubricant such as inorganic particles and additives are added to improve the functions as a film.

Biaxially Oriented Polyester Film and Film Roll Production Method

Biaxially oriented polyester film in accordance with the present invention may for example be obtained by causing chips of the polyester resin employing recycled PET bottles, and chips of a polyester resin composition that contains polyester resin as primary constituent thereof, to be supplied to and mixed in an extruder which is equipped with a hopper, causing this to be melt extruded by the extruder to form an unstretched sheet, and carrying out stretching of that unstretched PET sheet.

Although preferred examples are described below, it should be understood that there is no limitation with respect thereto.

A biaxially oriented polyester film in accordance with the present invention may have a laminated structure in which there is a single layer, or in which there are two layers, three layers, or four or more layers. Where the structure is such that there are two or more layers, while the constituents of each layer will be the polyester-type resin, and the inorganic particles, and furthermore the resin(s) other than the polyester-type resin that are as described above, the types and amounts of constituents contained therein will be different for each of the respective mutually adjacent layers.

Where the structure is such that there is a single layer, surface layer (A) in accordance with the present invention will be the entire biaxially oriented polyester film.

Where the structure is such that there are two layers, surface layer (A) in accordance with the present invention will be either one or both of the layers. Where the structure is such that there are three layers, surface layer (A) in accordance with the present invention will be the layer(s) at either one or both sides thereof.

Where the structure is such that there are three layers, if the compositions making up the film are represented by A, A', B, and C, then whereas it will be possible, for example, for constitutions in the form of A/B/C, A/B/A, and A/B/A' to be assumed, in situations where there is no particular need to vary the surface properties at the two faces, a constitution in the form of A/B/A, for which the design is such that the layers at either side have the same composition, is preferred, as it may be easily manufactured. Here, A and A' indicate compositions that are not identical.

In particular, when the structure is such that there are three layers, even where there are no inorganic particles present at base layer (B), as it will be possible to control the surface roughness of the film by controlling the amount of particles added to surface layer (A) only, permitting a smaller amount of inorganic particles to be contained within the film, this is preferred. This is also so as to be able to contribute to improvement of the situation whereby aroma retention might otherwise be reduced due to escape of olfactory components by way of voids (spaces) that tend to arise at boundaries between polyester resin and inorganic particles.

Moreover, to the extent that doing so would not adversely affect properties at the film surface, causing raw material recovered from edge portions produced during the film forming operation, and/or other raw material or the like recycled from the film forming operation, to be mixed within and used at base layer (B) at appropriate time(s) will be easy and will also be superior in terms of cost.

As described above, in the case of adopting a film configuration of two-layer structure or more, it is also possible to laminate chemically recycled polyester resin and mechanically recycled polyester resin as separate layers. For example, in the case of a three-layer configuration of A/B/A, by disposing chemically recycled polyester resin as layer A, the outermost layer, and disposing mechanically recycled polyester resin as layer B, the center layer, the chemically recycled polyester resin containing less impurities exists in the surface layer and this makes it possible to reduce defects in the film. Meanwhile, contrary to the above, by disposing mechanically recycled polyester resin as layer A, the outermost layer, and disposing chemically recycled polyester resin as layer B, the center layer, the mechanically recycled polyester resin having a high content of isophthalic acid exists on the surface layer side and this makes it possible to improve adhesion with sealants and the like.

The lower limit of the content of particles in surface layer (A) in the biaxially oriented polyester film in accordance with the present invention is 500 ppm weight, 600 ppm weight being more preferred, and 700 ppm mass being particularly preferred. When the content of particles is less than 500 ppm weight, this is not so preferred since there are situations in which this would cause reduction in lubricity of the film surface and winding properties.

It is preferred that the total amount of inorganic particles contained within all layers of a biaxially oriented polyester film in accordance with the present invention be not less than 100 ppm but not greater than 1000 ppm, and more preferred that this be not greater than 800 ppm. When inorganic particle content is less than 100 ppm, this will tend to cause lubricity to decrease, leading to occurrence of trouble when carrying out winding, rewinding, slitting, or the like or during travel of the roll during the course of film manufacturing operations, and will tend to cause production of scratches at the film surface, occurrence of wrinkles in the roll, and/or generation of static electricity. When inorganic particle content exceeds 1000 ppm, caution should be exercised, since there will be a tendency for maximum projecting height Sp and arithmetic mean height Sa at the film surface to become too high. Furthermore, there will be a tendency for voids within the film to increase, which can cause decrease in transparency.

When the polyester resin employing recycled PET bottles and the polyester resin composition are melt extruded, it is preferred that a hopper dryer, paddle dryer, or other such dryer or vacuum dryer be used to carry out drying thereof. The polyester resin employing recycled PET bottles and the polyester resin composition are dried in this way, then melted at a temperature that is equal to or higher than the melting point of the polyester resin and is 200° C. to 300° C., and extruded into a film using an extruder. Alternatively, the polyester resin, particles, and, where necessary, additives may be sent thereto by different extruders, and after these are combined, may be mixed and melted, and extruded in sheet-like fashion.

When extruding the molten resin composition, this may be carried out by adopting the T die method, tubular method, and/or any other such known method as desired.

In addition, by quenching the sheet-like molten polyester resin after it has been extruded, it is possible to obtain an unstretched sheet thereof. As method for quenching the molten polyester resin, a method in which the molten polyester resin from the orifice fixture is cast onto a rotating drum where it is quenched and allowed to solidify to obtain a substantially unoriented resin sheet might be favorably adopted. It is preferred that the temperature of the rotating drum be set so as to be not greater than 40° C.

Moreover, as a result of causing the unstretched sheet that is obtained to undergo a combination of operations such as the following biaxial stretching operation in which stretching is carried out in the machine direction and in the transverse direction, heat setting operation, thermal relaxation operation, and so forth, it is possible to obtain a biaxially oriented polyester film in accordance with the present invention.

Detailed description follows. "Machine direction" means the direction in which the unstretched sheet is made to travel; "transverse direction" means a direction perpendicular with respect thereto.

While it is possible for the stretching method to be either simultaneous biaxial stretching in which stretching in the machine direction and in the transverse direction are carried out simultaneously or sequential biaxial stretching in which stretching in either the machine direction or the transverse direction is carried out first, due to the fact that it will permit a high film formation speed for increased productivity, and due to the fact that it will permit the biaxially oriented polyester film that is ultimately obtained to be superior in terms of thickness uniformity, sequential biaxial stretching is most preferred.

Here, "film formation speed" means the rate of travel (m/min) of the biaxially oriented polyester film when it is being wound up into a master roll following passage through the stretching operation.

It is preferred that the temperature during stretching of an unstretched sheet in the machine direction be in the range of 80° C. to 130° C. and the stretching ratio be in the range of 3.3 to 4.7 times.

It is preferred that the temperature during stretching is 80° C. or more and the stretching ratio is 4.7 times or less since the shrinkage stress in the machine direction is reduced, the bowing phenomenon is reduced, and variations and distortion in molecular orientation property and heat shrinkage rate in the transverse direction of the obtained biaxially oriented polyester film decrease.

In the case of stretching an unstretched sheet in the machine direction, from the perspective of the scale of production equipment, production cost, and scratches such as adhesive scratches and transfer scratches caused by rolls, a method in which the unstretched sheet is heated using an infrared heater or the like and stretched is preferred to a method in which the unstretched sheet is stretched in multiple stages between a plurality of rolls since it is easy to obtain high temperatures, it is also easy to perform local heating, and scratches caused by rolls can be reduced.

The film obtained by carrying out stretching of the unstretched sheet in the machine direction thereof may, where necessary, be made to undergo corona treatment, plasma treatment, and/or other such surface treatment, following which, so as to impart it with slipperiness, adhesiveness, antistatic properties, and/or other such functionalities, a resin dispersion and/or a resin solution may be applied to at least one face of the film.

Where the film obtained by carrying out stretching of the unstretched sheet in the machine direction thereof is to be stretched in the transverse direction, this may be guided to a tenter apparatus, where the two ends of the film obtained as a result of causing the unstretched sheet to be stretched in the machine direction are gripped by clips, hot air may be used to heat the film to a prescribed temperature, following which the film may be stretched in the transverse direction by increasing the distance between the clips as it is transported in the machine direction.

In the biaxially oriented polyester film of the present invention, the crystallization temperature when heated of polyester resin employing recycled PET bottles with respect to the total amount of polyester resin making up the film is usually about 130° C., and thus the polyester resin is likely to fracture during stretching at stretching temperatures higher than 130° C. If the stretching temperature is lowered in order to suppress fracture during stretching, a difference in stretching stress in the machine direction generated by stretching in the transverse direction is likely to occur between the ends held by clips and the central portion where the constraint force is relatively small, the bowing phenomenon caused by non-uniformity of physical properties in the film transverse direction occurs, and variations and distortion in molecular orientation property and heat shrinkage rate in the film transverse direction are likely to occur.

In order to improve such non-uniformity of physical properties in the transverse direction of the film caused by fracture during stretching and bowing phenomenon, in the present invention, it is preferred that stretching in the machine direction be performed, then stretching in the transverse direction be performed in a tenter, and a cooling region be provided before the heat setting treatment region in the biaxial stretching step. The cooling region before the heat setting treatment region refers to a cooling step in which the temperature of the film stretched in the transverse direction is lowered after stretching in the transverse direction in the tenter, by, for example, a method in which hot air in the heating region is blocked with a shielding plate such as an aluminum plate inside the tenter in front of the heat setting treatment region, and a method in which hot air is blocked and then compressed air or the like is further sent actively.

The temperature of the film in the cooling region is preferably set to be equal to or lower than the glass transition temperature (Tg) of the film. When stretching in the transverse direction is performed in a tenter, since the constraint force at the central portion is relatively smaller compared to that at the ends held by clips, deformation due to the stretching stress in the machine direction generated by stretching in the transverse direction and shrinkage stress in the machine direction generated by heat setting treatment becomes greater and the bowing phenomenon is likely to increase. It is preferable to cool the film to a temperature equal to or lower than the glass transition temperature since the rigidity of the film is enhanced, deformation of the film is suppressed, and variations and distortion in molecular orientation property and heat shrinkage rate in the film transverse direction caused by the bowing phenomenon decrease.

The temperature in the cooling region is preferably 60° C. or more. It is preferable to cool the film to a temperature of 55° C. or more since the heat shrinkage rates in the machine direction and transverse direction of the film can be suppressed.

The preheating temperature during stretching in the transverse direction is preferably in the range of 100° C. to 130° C. It is preferred that the preheating temperature during stretching is 100° C. or more since the shrinkage stress generated during stretching in the machine direction is reduced, the bowing phenomenon is reduced, and variations and distortion in molecular orientation property and heat shrinkage rate in the transverse direction of the obtained biaxially oriented polyester film decrease.

The temperature during stretching in the transverse direction is preferably in the range of 105° C. to 135° C. It is preferred that the temperature during stretching is 105° C. or more since the stretching stress in the machine direction generated by stretching in the transverse direction is reduced and the bowing phenomenon is less likely to increase. It is preferred that the temperature during stretching is 135° C. or less since fracture is less likely to occur during stretching in the case of using polyester resin employing recycled PET bottles, of which the crystallization temperature when heated is about 130° C. as well.

The stretching ratio in the transverse direction is preferably in the range of 3.5 to 5.0 times. It is preferred that the stretching ratio in the transverse direction be 3.5 times or more since it is easy to obtain a high yield in terms of material balance, and the mechanical strength does not decrease as well as the thickness unevenness in the transverse direction is less likely to increase. It is preferred that the stretching ratio in the transverse direction be 5.0 times or less since fracture is less likely to occur during stretching and film formation.

A heat setting treatment step is performed subsequently to the step of biaxial stretching in the machine direction and transverse direction, and the heat setting temperature of the film obtained by stretching an unstretched sheet in the machine direction and stretching the obtained film in the transverse direction is preferably 220° C. or more and 250° C. or less.

It is preferred that the heat setting temperature be 220° C. or more since the heat shrinkage rate is not too high in both the machine direction and the transverse direction, and thermal dimensional stability during secondary processing is favorable.

Meanwhile, it is preferred that the heat setting temperature be 250° C. or less since bowing is less likely to increase, and variations and distortion in molecular orientation property and heat shrinkage rate in the film transverse direction decrease.

Moreover, a thermal relaxation treatment operation is carried out, it being possible to carry this out either separately from the heat setting operation after the heat setting operation has been carried out, or simultaneous with the heat setting operation. It is preferred that the percent relaxation in the transverse direction of the film during the thermal relaxation treatment operation be not less than 4% but not greater than 8%.

When the percent relaxation is not less than 4%, this is preferred, because thermal shrinkage will not be too high in the transverse direction of the biaxially oriented polyester film that is obtained, and dimensional stability during secondary treatment will be satisfactory.

It is preferred that the percent relaxation is 8% or less since the stretching stress in the machine direction generated by stretching in the transverse direction of the central portion of the film in the transverse direction is not too great and the bowing phenomenon is less likely to increase.

In the thermal relaxation treatment step, the film is in a situation to be significantly likely to fluctuate up and down since the constraint force in the transverse direction may decrease and the film may loosen by its own weight until the film obtained by stretching an unstretched sheet in the machine direction and stretching the film in the transverse direction is shrunk by thermal relaxation and the film may swell by the accompanying airflow of hot air blown from the nozzles installed above and below the film, and the amount of change in the orientation angle of the obtained biaxially oriented polyester film is likely to fluctuate greatly. As method for mitigation thereof, adjustment of the airspeed of hot air blown from nozzles thereabove and therebelow to cause parallelism of the film to be maintained may be cited as an example.

Moreover, so long as it does not impair the object of the present invention, a biaxially oriented polyester film in accordance with the present invention may be made to undergo corona discharge treatment, glow discharge treatment, flame treatment, and/or surface roughening treatment, and/or may be made to undergo publicly known anchor coat treatment, printing, ornamentation, and/or the like.

A wide biaxially oriented polyester film that has undergone stretching and film formation in accordance with the foregoing method(s) may be wound into a roll using a winder apparatus to fabricate a master roll. It is preferred that width of the master roll be not less than 5000 mm but not greater than 10000 mm. It is preferred that the width of the roll is 5000 mm or more since the cost per unit area of the film is low during the slitting step, vapor deposition, printing, and/or other such secondary processing that follow.

It is preferred that the wound length of the master roll be not less than 10000 m but not greater than 100000 m. When the wound length of the roll is not less than 5000 m, as the cost per unit area of the film during the slitting operation, vapor deposition treatment, printing treatment, and/or other such secondary processing that follows will be low, this is preferred.

Furthermore, it is preferred that the width of film rolls produced by slitting from the master roll be not less than 400 mm but not greater than 3000 mm. When roll width is not less than 400 mm, as there will be less inconvenience in terms of the frequent changing of film rolls that would otherwise need to be performed during the printing operation, this is preferred from the standpoint of cost. Furthermore, while it is preferred that roll width be large, when this is not greater than 3000 mm, as not only will roll width not be excessively large, but roll weight will also not be excessively large, and there will be no worsening of handling characteristics, this is preferred.

It is preferred that wound length of film rolls be not less than 2000 m but not greater than 65000 m. When wound length is not less than 2000 m, as there will be less inconvenience in terms of the frequent changing of film rolls that would otherwise need to be performed during the printing operation, this is preferred from the standpoint of cost. Furthermore, while it is preferred that wound length be large, when this is not greater than 65000 m, as not only will roll diameter not be excessively large, but roll weight will also not be excessively large, and there will be no worsening of handling characteristics, this is preferred.

While there is no particular limitation with respect to the roll core employed in the film roll, this is ordinarily of 3-inch (37.6-mm), 6-inch (152.2-mm), 8-inch (203.2-mm) diameter or other such size and made of plastic or made of metal, or a cylindrical roll core made of a cardboard tube may be used.

Biaxially Oriented Polyester Film and Film Roll Characteristics

It is preferred that the biaxially oriented polyester film formed from a polyester resin composition containing polyester resin employing recycled PET bottles and particles of the present invention meets all of the following requirements (1) to (4). Detailed description will be given with respect to each.

(1) The crystallization temperature when heated that is measured using a differential scanning calorimeter (DSC) is 120° C. or more and 139° C. or less.
(2) The amount of change in orientation angle with respect to the film transverse direction is 0° or more and 10° or less per 0.5 m.
(3) The heat shrinkage rate when heat treatment at 150° C. for 30 minutes is performed over the entire width of the film is in a range of 0.5% or more and 2.0% or less in the machine direction and in a range of −1.0% or more and 1.0% or less in the transverse direction.
(4) The content rate of an isophthalic acid component with respect to 100 mol % of total dicarboxylic acid components in the polyester resin composition is 0.01 mol % or more and 3.0 mol % or less.

Crystallization Temperature when Heated (Tc1)

The crystallization temperature when heated of the biaxially oriented polyester film of the present invention is preferably 139° C. or less, more preferably 135° C. or less. Since the crystallization temperature when heated of polyester resin employing recycled PET bottles is usually about 130° C. and is lower than the crystallization temperature when heated of polyester resin derived from fossil fuels, it is not so preferred that the crystallization temperature when heated in the film is higher than 139° C. since it is difficult to produce a polyester film containing recycled resin at a high ratio as a result.

Amount of Change in Orientation Angle in Film Transverse Direction

The amount of change in orientation angle with respect to the film transverse direction of the biaxially oriented polyester film of the present invention is preferably 0° or more and 10° or less, more preferably 0° or more and 8° or less, still more preferably 0° or more and 6° or less per 0.5 m. The orientation angle referred to here is the inclination of the main axis of molecular chain orientation with respect to the transverse direction. In a case where the amount of change in orientation angle is greater than 10° per 0.5 m, the main molecular orientation direction within the film width differs greatly, and thus travelling performance is likely to deteriorate, diagonal wrinkles are likely to be generated, partial processing unevenness and processing defects occur, and the film quality may be impaired during secondary processing such as vapor deposition and printing in the case of using a film roll obtained by winding a wide film. Here, sample collection positions over the entire width are a center position in the transverse direction and positions at intervals of 500 mm from the center position toward both ends, and are end positions where collection is possible in a case where intervals of 500 mm cannot be secured near both ends. It is assumed that the range is satisfied if the maximum value of each amount of change determined between two adjacent sample collection positions is within the range.

Heat Shrinkage Rate in Machine Direction and Transverse Direction

When heat treatment is performed on the film entire width of the biaxially oriented polyester film of the present invention at 150° C. for 30 minutes, the heat shrinkage rate is preferably in the range of 0.5% or more and 2.0% or less in the machine direction and −1.0% or more and 1.0% or less in the transverse direction, more preferably in the range of 0.8% or more and 1.8% or less in the machine direction and −0.8% or more and 0.8% or less in the transverse direction. It is preferred that the heat shrinkage rates in the machine and transverse directions are set to be within the ranges since dimensional stability against heat is acquired, deformation and wrinkling due to heat do not occur, and the film quality is less likely to be impaired during secondary processing such as vapor deposition and printing. Here, sample collection positions over the entire width are a center position in the transverse direction and positions at intervals of 500 mm from the center position toward both ends, and are end positions where collection is possible in a case where intervals of 500 mm cannot be secured near both ends. Paying attention to the maximum value and minimum value of data for each measurement position, it is assumed that it is within the range if both of the maximum value and minimum value satisfy the ranges.

Film Thickness

It is preferred that film thickness of a biaxially oriented polyester film in accordance with the present invention be 5 μm to 40 μm. When this is not less than 5 μm, as there will not be reduction in the stiffness or strength of the film, and there will tend not to be generation of wrinkles at the film roll when this is being wound up into a roll by a winder apparatus, this is preferred. On the other hand, within the range for which film thickness is not greater than 40 μm, it will be possible to obtain adequate strength and stiffness, and the decreased thickness will be preferred from the standpoint of cost. It is more preferred that thickness of the film be 8 μm to 30 μm, and particularly preferred that this be 9 μm to 20 μm.

WORKING EXAMPLES

A. Polyester Resin Evaluation Methods Were as Follows

Glass Transition Tg

A differential scanning calorimetric analyzer (Model DSC6220 manufactured by SII NanoTechnology Inc.) was used to melt a 5-mg resin sample in a nitrogen atmosphere until a temperature of 280° C. was reached, this was maintained thereat for 5 minutes, was thereafter quenched in liquid nitrogen, and measurement was carried out under conditions of a temperature rise rate of 20° C./minute from room temperature.

Intrinsic Viscosity (IV)

0.2 g of polyester resin was dissolved in 50 ml of a phenol/1,1,2,2-tetrachloroethane (60/40 (wt % ratio)) solvent mixture, measurement being carried out using an Ostwald viscometer at 30° C. Units were dl/g.

Amounts of Terephthalic Acid and Isophthalic Acid Components Contained within Polyester Making Up Film and Polyester Raw Material Sample solution was prepared by dissolving in a solvent containing a 10:1 (by volume) mixture of Chloroform D (manufactured by Yurisop) and Trifluoroacetic Acid D1 (manufactured by Yurisop), and using NMR ("Gemini-200"; manufactured by Varian, Inc.) to measure proton NMR of the sample solution under measurement conditions of temperature 23° C. and 64 integrated iterations. During NMR measurement, intensities of prescribed proton peaks were calculated, and the amounts (mol %) of the terephthalic acid component and the isophthalic acid component contained within 100 mol % of the acid component were calculated.

B. Polyester Film Evaluation Methods Were as Follows

Sampling of the film for evaluation of properties other than the processability evaluation of film roll shown below was performed from the surface layer of the biaxially oriented polyester film roll of the present invention.

Film Thickness

Measurement was carried out using a dial gauge in accordance with the method at JIS K7130-1999 A.

Crystallization Temperature when Heated

The measurement was performed on 8 mg of a sample cut from the film for evaluation using a differential scanning calorimeter (DSC60) manufactured by Shimadzu Corporation. Scanning was performed by adjusting the sample temperature in the order of (1) temperature rising from 25° C. to 320° C. at 10° C./min (2) quenching to 25° C. at 300° C./min (3) holding at 25° C. for 3 minutes (4) temperature rising from 25° C. to 320° C. at 10° C./min, and the peak top temperature of the exothermic curve of thermodynamic crystallization in (4) was taken as the crystallization temperature when heated (Tc1).

Heat Shrinkage Rate in Machine Direction and Transverse Direction

A sample having a width of 10 mm and a length of 250 mm was cut in the machine direction and transverse direction of the film for evaluation, and marked at intervals of 200 mm, and the mark interval (A) was measured under a constant tension of 5 gf. Next, the film was subjected to heat treatment at 150° C. for 30 minutes under no load, then the mark interval (B) was measured under a constant tension of 5 gf, and the heat shrinkage rate was determined by Equation (1). The measurement was performed on the entire width of the obtained biaxially oriented polyester film at the center and at intervals of 500 mm from the center position toward both ends. In a case where it was not possible to secure intervals of 500 mm near both ends, the measurement was performed on measurable end positions. With respect to the heat shrinkage rates thus determined, the maximum and minimum values of the heat shrinkage rates in the machine direction and transverse direction over the entire width of the film were determined.

$$\text{Heat shrinkage rate (\%)} = \{(A-B)/A\} \times 100 \qquad \text{Equation (1)}$$

Amount of Change in Orientation Angle in Film Transverse Direction

The film for evaluation was cut into a size of 100 mm×100 mm, and the orientation angle of the main axis of the molecular chain was determined by taking the axis in the transverse direction of the film as a reference using molecular orientation meter Model MOA-6004 manufactured by Oji Scientific Instruments. At this time, the counterclockwise inclination with respect to the film transverse direction was defined as +, and the clockwise inclination was defined as −. The measurement was performed on the entire width of the obtained biaxially oriented polyester film at the center and at intervals of 500 mm from the center position toward both ends. In a case where it was not possible to secure intervals of 500 mm near both ends, the measurement was performed on measurable end positions, and the measured value was divided by the distance between the measured sample intervals and converted to the value per 0.5 by Equation (2).

$$\text{Amount of change in orientation angle per 0.5 m } (°/0.5\text{ m}) = |\text{difference in orientation angle between two adjacent points } (°)| \div \text{distance between measured sample intervals (mm)} \times 500\text{ (mm/m)} \quad \text{(Equation 2)}$$

Then, the maximum value of the plurality of amounts of change between two adjacent sample collection positions calculated was taken as the evaluation result of the amount of change for the film.

Evaluation of Processability and Appearance of Film Roll

Gravure printing was performed on the obtained film roll (wound length: 60000 m, width: 800 mm) using a gravure printing machine (manufactured by Higashitani Tekkosho), and the processability of the film during printing and the appearance after processing were evaluated as GOOD or BAD. If sagging or wrinkling is not observed and travelling performance is favorable, it is evaluated as GOOD. If sagging and wrinkling are observed or travelling performance is not favorable, it is evaluated as BAD.

Details regarding the raw material resin chips used at the present Working Examples and Comparative Examples are indicated below.

(Polyester Resin A): Mechanically Recycled Polyester Resin

The following method was used to synthesize mechanically recycled polyester resin employing recycled PET bottles, the polyester resin being used to fabricate the biaxially oriented polyester film to be described later.

After any beverages or other such foreign matter remaining in PET bottles for beverage use were washed away therefrom, these were pulverized to obtain flakes. The flakes that were obtained were made to undergo cleaning while agitating in 3.5 wt % sodium hydroxide solution, conditions at this time being flake concentration 10 wt %, 85° C., and 30 minutes. Following alkali cleaning, the flakes were removed therefrom, and were made to undergo cleaning while agitating using distilled water, conditions at this time being flake concentration 10 wt %, 25° C., and 20 minutes. The distilled water was replaced and this rinsing in water was repeated two more times. Following rinsing in water, the flakes were dried, following which these were melted in an extruder, and this was made to undergo separation by filtration to remove successively more finely sized foreign matter by causing the filter to be changed to one having successively more finely sized openings, this being done two times, and on the third time, separation by filtration was carried out using the filter having the smallest openings, these being 50 μm, to obtain Polyester Resin A having an intrinsic viscosity of 0.69 dl/g and an isophthalic acid content rate of 3.0 mol %.

(Polyester Resin B)

As PET resin derived from fossil fuel that was used to fabricate biaxially oriented polyester film as described below, terephthalic acid//ethylene glycol=100//100 (mol %) (intrinsic viscosity 0.62 dl/g; manufactured by Toyobo Co., Ltd.) was used.

(Polyester Resin C): Chemically Recycled Polyester Resin

The following method was used to synthesize chemically recycled polyester resin reconstituted from PET bottles that was used to fabricate biaxially oriented polyester film as described below.

A bale of PET bottles that had been separated, collected, and recovered were fed into a wet grinder, pulverization was carried out while 1,000 liters of water to which 500 g of liquid kitchen detergent had been added was made to circulate within the foregoing wet grinder, a gravimetric separator connected to the grinder was used to cause sedimentation of metal, sand, glass, and other such substances of high specific gravity, and flakes were extracted from the fraction at the upper layer thereof. These flakes were washed with pure water and made to undergo centrifugal dewatering to produce recovered flakes.

30 kg of the foregoing recovered flakes that had been melted while in a nondry state were loaded into an autoclave equipped with an agitator and in which there was a liquid mixture of 150 g of zinc acetate dihydrate and 150 kg of ethylene glycol that had been preheated, and following removal of the fractions of boiling point lower than ethylene glycol such as acetic acid and water, a reflux condenser was used to react this for 4 hours at a temperature of 195° to 200° C.

Following completion of the reaction, the temperature of the contents of the reaction vessel was lowered to 97° to 98° C., and a filter was used to carry out hot filtration to remove suspended matter and sediment.

Following hot filtration, the filtrate was further cooled, and after confirming that the crude BHET was completely dissolved, prepurification treatment was performed by causing this to pass through an activated carbon bed and then through an anion/cation exchange mixed bed for 30 minutes at 50° to 51° C.

The prepurification-treated solution was again loaded into an agitating-type autoclave, and heated to distill the excess ethylene glycol therefrom at normal pressure to obtain a concentrated BHET melt.

The concentrated BHET melt that was obtained was allowed to cool naturally while being agitated in a nitrogen gas atmosphere, and this was thereafter removed from the autoclave to obtain a concentrated BHET chip block.

This chip block was again heated to 130° C. and melted, following which this was supplied by means of a metering pump to a thin film vacuum evaporator, where evaporation and cold condensation were carried out to obtain purified BHET.

This purified BHET was used as raw material to carry out melt polymerization to obtain chemically recycled Polyester Resin C having an intrinsic viscosity of 0.696 dl/g.

(Polyester Resin D)

The temperature of an esterification reaction vessel was increased, and at the point in time when 200° C. was reached, a slurry consisting of terephthalic acid [86.4 parts by mass] and ethylene glycol [64.4 parts by mass] was loaded thereinto, and catalyst in the form of antimony trioxide [0.017 part by mass] and triethylamine [0.16 part by mass] was added thereto while this was agitated. This was then heated and increased in temperature, and a pressure esterification reaction was carried out under the conditions of gauge pressure 0.34 MPa and 240° C.

The interior of the esterification reaction vessel was thereafter returned to normal pressure, and magnesium acetate tetrahydrate [0.071 part by mass], and then trimethyl phosphate [0.014 part by mass], were added thereto. Moreover, after 15 minutes had elapsed, temperature was increased to 260° C., following which trimethyl phosphate [0.012 part by mass], and then sodium acetate [0.0036 part by mass], were added thereto, following which, 15 minutes thereafter, a high-pressure disperser was used to carry out dispersion treatment, and 0.72 part by weight, based on particle content, of an ethylene glycol slurry of amorphous silica particles of average particle diameter 2.7 μm was further added thereto. These silica particles were the particles obtained when an ethylene glycol slurry was prepared in advance, this was subjected to centrifugal separation processing, 35% of the coarse particulate fraction was removed, following which filtration treatment as carried out using a metal filter having 5-μm openings. After 15 minutes had elapsed, the obtained esterification reaction product was transferred to a polycondensation reaction vessel, and made to undergo a polycondensation reaction under a vacuum condition at 280° C. to obtain Polyester Resin D having an intrinsic viscosity of 0.62 dl/g.

(Polyester Resin E)

The temperature of an esterification reaction vessel was increased, and at the point in time when 200° C. was reached, a slurry consisting of terephthalic acid [86.4 parts by mass] and ethylene glycol [64.4 parts by mass] was loaded thereinto, and catalyst in the form of antimony trioxide [0.017 part by mass] and triethylamine [0.16 part by mass] was added thereto while this was agitated. This was then heated and increased in temperature, and a pressure esterification reaction was carried out under the conditions of gauge pressure 0.34 MPa and 240° C.

The interior of the esterification reaction vessel was thereafter returned to normal pressure, and magnesium acetate tetrahydrate [0.071 part by mass], and then trimethyl phosphate [0.014 part by mass], were added thereto. Moreover, after 15 minutes had elapsed, temperature was increased to 260° C., following which trimethyl phosphate [0.012 part by mass], and then sodium acetate [0.0036 part by mass], were added thereto, following which, 15 minutes thereafter, a high-pressure disperser was used to carry out dispersion treatment, and 30.0 parts by weight, based on particle content, of an ethylene glycol slurry of amorphous silica particles of average particle diameter 2.7 μm was further added thereto. These silica particles were the particles obtained when an ethylene glycol slurry was prepared in advance, this was subjected to centrifugal separation processing, 35% of the coarse particulate fraction was removed, following which filtration treatment as carried out using a metal filter having 5-μm openings. After 15 minutes had elapsed, the obtained esterification reaction product was transferred to a polycondensation reaction vessel, and made to undergo a polycondensation reaction under a vacuum condition at 280° C. to obtain Polyester Resin E having an intrinsic viscosity of 0.61 dl/g.

Raw material resin chips were as indicated at TABLE 1. Note that the following abbreviations are used in the table.

TPA: Terephthalic acid

EG: Ethylene glycol

Working Example 1

Three extruders were used to form a film having a three-layer constitution. Base layer (B) was such that Polyester Resin A was 95.0 mass % and Polyester Resin D was 5.0 mass; surface layer (A) was such that Polyester Resin A was 87.5 mass % and Polyester Resin D was 12.5 mass. Following drying of the respective resin raw materials, the first and third extruders were used to melt extrude the resin mixture for formation of surface layer (A) at a resin temperature of 285° C., and the second extruder was used to melt the resin mixture for formation of base layer (B) at a resin temperature of 285° C., these being combined and laminated together so as to cause thicknesses to be in the ratio 1/10/1 (μm) within the T die, the order thereof being, from the side that came in contact with the casting drum, surface layer (A)/base layer (B)/surface layer (A), these being expelled from the T-shaped orifice fixture, and being cooled and solidified at a casting drum having a surface temperature of 25° C. to obtain an unstretched polyethylene terephthalate sheet.

At this time, a wire-like electrode of diameter 0.15 mm was used to cause application of static electricity to cause the three-layer unstretched film that was obtained to adhere to the cooling drum.

The obtained unstretched film was heated to 120° C. using an infrared heater and stretched in one stage in the machine direction at a stretching ratio of 4.0 times.

Subsequently, the film was stretched in the transverse direction using a tenter type horizontal stretching machine at a preheating temperature of 120° C., a stretching temperature of 130° C., and a stretching ratio of 4.2 times. Furthermore, in the cooling region provided before the subsequent heat setting treatment region of the tenter, hot air was blocked by aluminum plates pasted on the top, bottom, left and right, and compressed air was sent to perform cooling so that the temperature in the cooling region was 70° C. Thereafter, heat setting was carried out at 245° C., 5% thermal relaxation treatment was carried out in the transverse direction, corona treatment was carried out on surface layer (A) on the side in contact with the chill roller under conditions of 40 W·min/m$^2$, and a winder was used to wind this up into a roll, thereby fabricating a master roll (wound length 60000 m; width 8000 mm) of a biaxially oriented polyester film having a thickness of 12 μm.

A roll of biaxially oriented polyester film was wound onto a roll core of diameter 6 inches (152.2 mm) from the master roll that was obtained, surface pressure being applied to the film roll by a contact roller and tension being applied to the film by a two-shaft turret winder as this was slit to a width of 800 mm to cause this to be wound up into a film roll.

TABLE 1

| | Dicarboxylic acid component TPA mol % | Polyhydric alcohol component EG mol % | Isophthalic acid content rate mol % | Silica ($SiO_2$) Shape — | Weight average particle diameter μm | $SiO_2$ content ppm | Intrinsic viscosity dl/g |
|---|---|---|---|---|---|---|---|
| Polyester resin A | 97 | 100 | 3.0 | — | — | — | 0.69 |
| Polyester resin B | 100 | 100 | 0 | — | — | — | 0.62 |
| Polyester resin C | 100 | 100 | 0 | — | — | — | 0.67 |
| Polyester resin D | 100 | 100 | 0 | Amorphous | 2.7 | 7200 | 0.62 |
| Polyester resin E | 100 | 100 | 0 | Amorphous | 2.7 | 300000 | 0.61 |

Raw material composition and film formation conditions for the film that was obtained, and physical properties and results of evaluation for the film that was obtained, are shown in TABLE 2. Evaluation of the film was carried out at the surface layer (A) on the side that came in contact with the chill roller.

Working Example 2

A biaxially stretched film was formed in the same manner as in Working Example 1 except that the preheating temperature in the transverse direction was changed to 105° C., and a biaxially oriented polyester film having a thickness of 12 μm was obtained. Raw material composition and film formation conditions for the film that was obtained, and physical properties and results of evaluation for the film that was obtained, are shown in TABLE 2. Evaluation of the film was carried out at the surface layer (A) on the side that came in contact with the chill roller.

Working Example 3

A biaxially stretched film was formed in the same manner as in Working Example 1 except that the thermal relaxation rate in the transverse direction was changed to 8%, and a biaxially oriented polyester film having a thickness of 12 μm was obtained. Raw material composition and film formation conditions for the film that was obtained, and physical properties and results of evaluation for the film that was obtained, are shown in TABLE 2. Evaluation of the film was carried out at the surface layer (A) on the side that came in contact with the chill roller.

Working Example 4

A biaxially stretched film was formed in the same manner as in Working Example 1 except that raw materials were changed so that surface layer (A) was such that Polyester Resin A was 99.7 mass % and Polyester Resin E was 0.3 mass, and base layer (B) was such that Polyester Resin A was 99.88 mass and Polyester Resin E was 0.12 mass %, and a biaxially oriented polyester film having a thickness of 12 μm was obtained. Raw material composition and film formation conditions for the film that was obtained, and physical properties and results of evaluation for the film that was obtained, are shown in TABLE 2. The evaluation of the film was performed on the layer A surface on the side in contact with the chill roller.

Working Example 5

A biaxially stretched film was formed in the same manner as in Working Example 1 except that raw materials were changed so that surface layer (A) was such that Polyester Resin A was 72.2 mass % and Polyester Resin D was 27.8 masse, and base layer (B) was such that Polyester Resin A was 72.2 mass and Polyester Resin D was 27.8 mass %, and a biaxially oriented polyester film having a thickness of 12 μm was obtained. Raw material composition and film formation conditions for the film that was obtained, and physical properties and results of evaluation for the film that was obtained, are shown in TABLE 2. The evaluation of the film was performed on the layer A surface on the side in contact with the chill roller.

Working Example 6

Except for the fact that raw materials were changed so that Polyester Resin A employed at surface layer (A) and base layer (B) in Working Example 1 was Polyester Resin A/Polyester Resin C in a ratio of 50/50, formation of biaxially stretched film was carried out in similar fashion as at Working Example 1 to obtain biaxially oriented polyester film of thickness 12 μm. Raw material composition and film formation conditions for the film that was obtained, and physical properties and results of evaluation for the film that was obtained, are shown in TABLE 2. Evaluation of the film was carried out at the surface layer (A) on the side that came in contact with the chill roller.

Working Example 7

Except for the fact that Polyester Resin A employed at surface layer (A) and base layer (B) in Working Example 1 was changed to Polyester Resin A/Polyester Resin C in a ratio of 10/90, formation of biaxially stretched film was carried out in similar fashion as at Working Example 1 to obtain biaxially oriented polyester film of thickness 12 μm. Raw material composition and film formation conditions for the film that was obtained, and physical properties and results of evaluation for the film that was obtained, are shown in TABLE 2. Evaluation of the film was carried out at the surface layer (A) on the side that came in contact with the chill roller.

Working Example 8

A biaxially stretched film was formed in the same manner as in Working Example 1 except that Polyester Resin A was employed in surface layer (A) and Polyester Resin C was employed in base layer (B) in Working Example 1, and a biaxially oriented polyester film having a thickness of 12 μm was obtained. Raw material composition and film formation conditions for the film that was obtained, and physical properties and results of evaluation for the film that was obtained, are shown in TABLE 2. Evaluation of the film was carried out at the surface layer (A) on the side that came in contact with the chill roller.

Working Example 9

A biaxially stretched film was formed in the same manner as in Working Example 1 except that Polyester Resin C was employed in surface layer (A) and Polyester Resin A was employed in base layer (B) in Working Example 1, and a biaxially oriented polyester film having a thickness of 12 μm was obtained. Raw material composition and film formation conditions for the film that was obtained, and physical properties and results of evaluation for the film that was obtained, are shown in TABLE 2. Evaluation of the film was carried out at the surface layer (A) on the side that came in contact with the chill roller.

Comparative Example 1

A biaxially stretched film was formed in the same manner as in Working Example 1 except that the polyester resin of surface layer (A) was changed to polyester resin B as raw materials, the stretching temperature in the machine direction was changed to 130° C., the preheating temperature in the transverse direction was changed to 130° C., and the stretching temperature in the transverse direction was changed to 140° C., and a biaxially oriented polyester film having a thickness of 12 μm was obtained. Raw material composition and film formation conditions for the film that was obtained, and physical properties and results of evaluation for the film that was obtained, are shown in TABLE 2. Evaluation of the film was carried out at the surface layer (A) on the side that came in contact with the chill roller.

Comparative Example 2

A biaxially stretched film was formed in the same manner as in Working Example 1 except that the cooling region was not provided before the heat setting treatment region as the biaxial stretching step, and a biaxially oriented polyester film having a thickness of 12 μm was obtained. Raw material composition and film formation conditions for the film that was obtained, and physical properties and results of evaluation for the film that was obtained, are shown in TABLE 2. Evaluation of the film was carried out at the surface layer (A) on the side that came in contact with the chill roller.

Comparative Example 3

A biaxially stretched film was formed in the same manner as in Working Example 1 except that the temperature in the cooling region was changed to 50° C. before the heat setting treatment region, and a biaxially oriented polyester film having a thickness of 12 μm was obtained. Raw material composition and film formation conditions for the film that was obtained, and physical properties and results of evaluation for the film that was obtained, are shown in TABLE 2. Evaluation of the film was carried out at the surface layer (A) on the side that came in contact with the chill roller.

Comparative Example 4

A biaxially stretched film was formed in the same manner as in Working Example 1 except that the stretching temperature in the transverse direction was changed to 145° C., and a biaxially oriented polyester film having a thickness of 12 μm was obtained. Raw material composition and film formation conditions for the film that was obtained, and physical properties and results of evaluation for the film that was obtained, are shown in TABLE 2. Evaluation of the film was carried out at the surface layer (A) on the side that came in contact with the chill roller.

Comparative Example 5

A biaxially stretched film was formed in the same manner as in Working Example 1 except that raw materials were changed so that surface layer (A) was such that Polyester Resin A was 91.7 mass % and Polyester Resin C was 8.3 mass % and base layer (B) was such that Polyester Resin A was 91.7 mass % and Polyester Resin C was 8.3 mass %, the stretching temperature in the machine direction was changed to 115° C., the stretching temperature in the transverse direction was changed to 115° C., the heat setting treatment temperature was changed to 235° C., preheating in the transverse direction was not provided, and the cooling region was not provided before the heat setting treatment region, and a biaxially oriented polyester film having a thickness of 12 μm was obtained. Raw material composition and film formation conditions for the film that was obtained, and physical properties and results of evaluation for the film that was obtained, are shown in TABLE 2. The evaluation of the film was performed on the layer A surface on the side in contact with the chill roller.

TABLE 2A

| | | Working Example 1 | | | Working Example 2 | | | Working Example 3 | | |
|---|---|---|---|---|---|---|---|---|---|---|
| | | Layer A | Layer B | Layer A | Layer A | Layer B | Layer A | Layer A | Layer B | Layer A |
| Resin chip mixing ratio (mass %) | Polyester resin A | 87.5 | 95 | 87.5 | 87.5 | 95 | 87.5 | 87.5 | 95 | 87.5 |
| | Polyester resin B | — | — | — | — | — | — | — | — | — |
| | Polyester resin C | — | — | — | — | — | — | — | — | — |
| | Polyester resin D | 12.5 | 5 | 12.5 | 12.5 | 5 | 12.5 | 12.5 | 5 | 12.5 |
| | Polyester resin E | — | — | — | — | — | — | — | — | — |
| | Shape of silica | Amorphous | | | Amorphous | | | Amorphous | | |
| | Weight average particle diameter of silica (μm) | 2.7 | | | 2.7 | | | 2.7 | | |
| | Amount of silica added (ppm weight) | 900 | 360 | 900 | 900 | 360 | 900 | 900 | 360 | 900 |
| Film forming step | Cooling region | Presence | | | Presence | | | Presence | | |
| | Thickness of T-die layer (μm) | A/B/A = 1/10/1 | | | A/B/A = 1/10/1 | | | A/B/A = 1/10/1 | | |
| | Application of static electricity | Wire-shaped electrode Diameter 0.15 mm | | | Wire-shaped electrode Diameter 0.15 mm | | | Wire-shaped electrode Diameter 0.15 mm | | |
| | Chill roller cooling temperature (° C.) | 25 | | | 25 | | | 25 | | |
| | Stretching temperature in machine direction (° C.) | 120 | | | 120 | | | 120 | | |
| | Stretching ratio in machine direction (times) | 4.0 | | | 4.0 | | | 4.0 | | |
| | Preheating temperature in transverse direction (° C.) | 120 | | | 105 | | | 120 | | |

TABLE 2A-continued

| | | | | | |
|---|---|---|---|---|---|
| | | Stretching temperature in transverse direction (° C.) | 130 | 130 | 130 |
| | | Stretching ratio in transverse direction (times) | 4.2 | 4.2 | 4.2 |
| | | Cooling region temperature (° C.) | 70 | 70 | 70 |
| | | Heat setting temperature (° C.) | 245 | 245 | 245 |
| | | Thermal relaxation rate in transverse direction (%) | 5 | 5 | 8 |
| | | Film thickness (μm) | 12 | 12 | 12 |
| Properties | | Crystallization temperature Tc1 (° C.) | 132 | 131 | 131 |
| | Heat shrinkage rate in machine direction (%) | Maximum value | 1.5 | 1.6 | 1.6 |
| | | Minimum value | 1.2 | 1.2 | 1.1 |
| | Heat shrinkage rate in transverse direction (%) | Maximum value | 0.1 | 0.2 | −0.2 |
| | | Minimum value | −0.1 | 0 | −0.7 |
| | | Amount of change in orientation angle per 0.5 m (°/0.5 m) | 3 | 7 | 5 |
| | | Isophthalic acid content rate (mol %) | 2.81 | 2.81 | 2.81 |
| | | Processability | GOOD | GOOD | GOOD |

| | | Working Example 4 | | | Working Example 5 | | |
|---|---|---|---|---|---|---|---|
| | | Layer A | Layer B | Layer A | Layer A | Layer B | Layer A |
| Resin chip mixing ratio (mass %) | Polyester resin A | 99.70 | 99.88 | 99.7 | 72.2 | 72.2 | 72.2 |
| | Polyester resin B | — | — | — | — | — | — |
| | Polyester resin C | — | — | — | — | — | — |
| | Polyester resin D | — | — | — | 27.8 | 27.8 | 27.8 |
| | Polyester resin E | 0.3 | 0.12 | 0.3 | — | — | — |
| | Shape of silica | | Amorphous | | | Amorphous | |
| | Weight average particle diameter of silica (μm) | | 2.7 | | | 2.7 | |
| | Amount of silica added (ppm weight) | 900 | 360 | 900 | 2000 | 2000 | 2000 |
| Film forming step | Cooling region | | Presence | | | Presence | |
| | Thickness of T-die layer (μm) | | A/B/A = 1/10/1 | | | A/B/A = 1/10/1 | |
| | Application of static electricity | | Wire-shaped electrode Diameter 0.15 mm | | | Wire-shaped electrode Diameter 0. 15 mm | |
| | Chill roller cooling temperature (° C.) | | 25 | | | 25 | |
| | Stretching temperature in machine direction (° C.) | | 120 | | | 120 | |
| | Stretching ratio in machine direction (times) | | 4.0 | | | 4.0 | |
| | Preheating temperature in transverse direction (° C.) | | 120 | | | 120 | |
| | Stretching temperature in transverse direction (° C.) | | 130 | | | 130 | |
| | Stretching ratio in transverse direction (times) | | 4.2 | | | 4.2 | |

TABLE 2A-continued

| | | | | |
|---|---|---|---|---|
| | Cooling region temperature (° C.) | | 70 | 70 |
| | Heat setting temperature (° C.) | | 245 | 245 |
| | Thermal relaxation rate in transverse direction (%) | | 5 | 5 |
| | Film thickness (µm) | | 12 | 12 |
| Properties | Crystallization temperature Tc1 (° C.) | | 131 | 133 |
| | Heat shrinkage rate in machine direction (%) | Maximum value | 1.5 | 1.6 |
| | | Minimum value | 1.1 | 1.2 |
| | Heat shrinkage rate in transverse direction (%) | Maximum value | 0.1 | 0.1 |
| | | Minimum value | −0.2 | −0.1 |
| | Amount of change in orientation angle per 0.5 m (°/0.5 m) | | 4 | 3 |
| | Isophthalic acid content rate (mol %) | | 3.00 | 2.17 |
| | Processability | | GOOD | GOOD |

TABLE 2B

| | | Working Example 6 | | | Working Example 7 | | | Working Example 8 | | | Working Example 9 | | |
|---|---|---|---|---|---|---|---|---|---|---|---|---|---|
| | | Layer A | Layer B | Layer A | Layer A | Layer B | Layer A | Layer A | Layer B | Layer A | Layer A | Layer B | Layer A |
| Resin chip mixing ratio (mass %) | Polyester resin A | 43.75 | 47.51 | 43.75 | 8.75 | 9.5 | 8.75 | 87.5 | 0 | 87.5 | 0 | 95 | 0 |
| | Polyester resin B | — | — | — | — | — | — | — | — | — | — | — | — |
| | Polyester resin C | 43.75 | 47.5 | 43.75 | 78.75 | 85.5 | 78.75 | 0 | 95 | 0 | 87.5 | 0 | 87.5 |
| | Polyester resin D | 12.5 | 5 | 12.5 | 12.5 | 5 | 12.5 | 12.5 | 5 | 12.5 | 12.5 | 5 | 12.5 |
| | Polyester resin E | — | — | — | — | — | — | — | — | — | — | — | — |
| | Shape of silica | | Amorphous | | | Amorphous | | | Amorphous | | | Amorphous | |
| | Weight average particle diameter of silica (µm) | | 2.7 | | | 2.7 | | | 2.7 | | | 2.7 | |
| | Amount of silica added (ppm weight) | 900 | 360 | 900 | 900 | 360 | 900 | 900 | 360 | 900 | 900 | 360 | 900 |
| Film forming step | Cooling region | | Presence | | | Presence | | | Presence | | | Presence | |
| | Thickness of T-die layer (µm) | | A/B/A = 1/10/1 | | | A/B/A = 1/10/1 | | | A/B/A = 1/10/1 | | | A/B/A = 1/10/1 | |
| | Application of static electricity | | Wire-shaped electrode Diameter 0.15 mm | | | Wire-shaped electrode Diameter 0.15 mm | | | Wire-shaped electrode Diameter 0.15 mm | | | Wire-shaped electrode Diameter 0.15 mm | |
| | Chill roller cooling temperature (° C.) | | 25 | | | 25 | | | 25 | | | 25 | |
| | Stretching temperature in machine direction (° C.) | | 120 | | | 120 | | | 120 | | | 120 | |
| | Stretching ratio in machine direction (times) | | 4.0 | | | 4.0 | | | 4.0 | | | 4.0 | |
| | Preheating temperature in transverse direction (° C.) | | 120 | | | 120 | | | 120 | | | 120 | |
| | Stretching temperature in transverse direction (° C.) | | 130 | | | 130 | | | 130 | | | 130 | |
| | Stretching ratio in transverse direction (times) | | 4.2 | | | 4.2 | | | 4.2 | | | 4.2 | |
| | Cooling region temperature (° C.) | | 70 | | | 70 | | | 70 | | | 70 | |

TABLE 2B-continued

| | | Working Example 6 | | | Working Example 7 | | | Working Example 8 | | | Working Example 9 | | |
|---|---|---|---|---|---|---|---|---|---|---|---|---|---|
| | | Layer A | Layer B | Layer A | Layer A | Layer B | Layer A | Layer A | Layer B | Layer A | Layer A | Layer B | Layer A |
| | Heat setting temperature (° C.) | 245 | | | 245 | | | 245 | | | 245 | | |
| | Thermal relaxation rate in transverse direction (%) | 5 | | | 5 | | | 5 | | | 5 | | |
| | Film thickness (μm) | 12 | | | 12 | | | 12 | | | 12 | | |
| Properties | Crystallization temperature Tc1 (° C.) | 135 | | | 137 | | | 136 | | | 132 | | |
| | Heat shrinkage rate in machine direction (%) Maximum value | 1.6 | | | 1.5 | | | 1.6 | | | 1.5 | | |
| | Heat shrinkage rate in machine direction (%) Minimum value | 1.1 | | | 1.3 | | | 1.2 | | | 1.1 | | |
| | Heat shrinkage rate in transverse direction (%) Maximum value | 0.2 | | | 0.1 | | | 0.0 | | | 0.2 | | |
| | Heat shrinkage rate in transverse direction (%) Minimum value | −0.1 | | | −0.2 | | | −0.2 | | | −0.1 | | |
| | Amount of change in orientation angle per 0.5 m (°/0.5 m) | 3 | | | 1 | | | 4 | | | 3 | | |
| | Isophthalic acid content rate (mol %) | 1.41 | | | 0.28 | | | 0.44 | | | 2.38 | | |
| | Processability | GOOD | | | GOOD | | | GOOD | | | GOOD | | |

TABLE 2C

| | | Comparative Example 1 | | | Comparative Example 2 | | | Comparative Example 3 | | |
|---|---|---|---|---|---|---|---|---|---|---|
| | | Layer A | Layer B | Layer A | Layer A | Layer B | Layer A | Layer A | Layer B | Layer A |
| Resin chip mixing ratio (mass %) | Polyester resin A | — | — | — | 87.5 | 95 | 87.5 | 87.5 | 95 | 87.5 |
| | Polyester resin B | 87.5 | 95 | 87.5 | — | — | — | — | — | — |
| | Polyester resin C | — | — | — | — | — | — | — | — | — |
| | Polyester resin D | 12.5 | 5 | 12.5 | 12.5 | 5 | 12.5 | 12.5 | 5 | 12.5 |
| | Polyester resin E | — | — | — | — | — | — | — | — | — |
| | Shape of silica | Amorphous | | | Amorphous | | | Amorphous | | |
| | Weight average particle diameter of silica (μm) | 2.7 | | | 2.7 | | | 2.7 | | |
| | Amount of silica added (ppm weight) | 900 | 360 | 900 | 900 | 360 | 900 | 900 | 360 | 900 |
| Film forming step | Cooling region | Presence | | | Absence | | | Presence | | |
| | Thickness of T-die layer (μm) | A/B/A = 1/10/1 | | | A/B/A = 1/10/1 | | | A/B/A = 1/10/1 | | |
| | Application of static electricity | Wire-shaped electrode Diameter 0.15 mm | | | Wire-shaped electrode Diameter 0.15 mm | | | Wire-shaped electrode Diameter 0.15 mm | | |
| | Chill roller cooling temperature (° C.) | 25 | | | 25 | | | 25 | | |
| | Stretching temperature in machine direction (° C.) | 130 | | | 120 | | | 120 | | |
| | Stretching ratio in machine direction (times) | 4.0 | | | 4.0 | | | 4.0 | | |
| | Preheating temperature in transverse direction (° C.) | 130 | | | 120 | | | 120 | | |
| | Stretching temperature in transverse direction (° C.) | 140 | | | 130 | | | 130 | | |
| | Stretching ratio in transverse direction (times) | 4.2 | | | 4.2 | | | 4.2 | | |

TABLE 2C-continued

| | | | | |
|---|---|---|---|---|
| | Cooling region temperature (° C.) | 70 | — | 50 |
| | Heat setting temperature (° C.) | 245 | 245 | 245 |
| | Thermal relaxation rate in transverse direction (%) | 5 | 5 | 5 |
| | Film thickness (μm) | 12 | 12 | 12 |
| Properties | Crystallization temperature Tc1 (° C.) | 144 | 134 | 132 |
| | Heat shrinkage rate in machine direction (%) Maximum value | 1.3 | 1.5 | 2.8 |
| | Heat shrinkage rate in machine direction (%) Minimum value | 1.0 | 1.0 | 2.5 |
| | Heat shrinkage rate in transverse direction (%) Maximum value | 0.3 | 0.3 | 2.3 |
| | Heat shrinkage rate in transverse direction (%) Minimum value | 0.1 | −0.2 | 2.1 |
| | Amount of change in orientation angle per 0.5 m (°/0.5 m) | 2 | 14 | 4 |
| | Isophthalic acid content rate (mol %) | 0.00 | 2.81 | 2.81 |
| | Processability | GOOD | BAD | BAD |

| | | Comparative Example 4 | | | Comparative Example 5 | | |
|---|---|---|---|---|---|---|---|
| | | Layer A | Layer B | Layer A | Layer A | Layer B | Layer A |
| Resin chip mixing ratio (mass %) | Polyester resin A | 87.5 | 95 | 87.5 | 91.7 | 91.7 | 91.7 |
| | Polyester resin B | — | — | — | — | — | — |
| | Polyester resin C | — | — | — | — | — | — |
| | Polyester resin D | 12.5 | 5 | 12.5 | 8.3 | 8.3 | 8.3 |
| | Polyester resin E | — | — | — | — | — | — |
| | Shape of silica | Amorphous | | | Amorphous | | |
| | Weight average particle diameter of silica (μm) | 2.7 | | | 2.7 | | |
| | Amount of silica added (ppm weight) | 900 | 360 | 900 | 600 | 600 | 600 |
| Film forming step | Cooling region | Presence | | | Absence | | |
| | Thickness of T-die layer (μm) | A/B/A = 1/10/1 | | | A/B/A = 1/10/1 | | |
| | Application of static electricity | Wire-shaped electrode Diameter 0. 15 mm | | | Wire-shaped electrode Diameter 0.15 mm | | |
| | Chill roller cooling temperature (° C.) | 25 | | | 25 | | |
| | Stretching temperature in machine direction (° C.) | 120 | | | 115 | | |
| | Stretching ratio in machine direction (times) | 4.0 | | | 4.0 | | |
| | Preheating temperature in transverse direction (° C.) | 120 | | | — | | |
| | Stretching temperature in transverse direction (° C.) | 145 | | | 115 | | |
| | Stretching ratio in transverse direction (times) | 4.2 | | | 4.3 | | |
| | Cooling region temperature (° C.) | 70 | | | — | | |
| | Heat setting temperature (° C.) | 245 | | | 235 | | |
| | Thermal relaxation rate in transverse direction (%) | 5 | | | 5 | | |
| | Film thickness (μm) | 12 | | | 12 | | |

TABLE 2C-continued

| | | | | |
|---|---|---|---|---|
| Properties | Crystallization temperature Tc1 (° C.) | | 131 | 132 |
| | Heat shrinkage rate in machine direction (%) | Maximum value | 1.4 | 1.8 |
| | | Minimum value | 1.2 | 1.5 |
| | Heat shrinkage rate in transverse direction (%) | Maximum value | 0.1 | 0.5 |
| | | Minimum value | −0.1 | 0.1 |
| | Amount of change in orientation angle per 0.5 m (°/0.5 m) | | 2 | 12 |
| | Isophthalic acid content rate (mol %) | | 2.81 | 2.75 |
| | Processability | | — | BAD |

As the results shown in Table 2, in the films of Working Examples 1 to 5, since the crystallization temperature when heated, amount of change in orientation angle in the transverse direction, heat shrinkage rates in the machine and transverse directions over the entire width, and the content of isophthalic acid component are within the specified ranges, the films are biaxially oriented polyester films that are suitable for various processing applications as there are little variations and distortion in molecular orientation property and heat shrinkage rate in the film transverse direction and the physical properties in the film transverse direction are uniform and are environmentally friendly as polyester resin employing recycled PET bottles is used.

In Comparative Example 1, since the amount of change in orientation angle in the transverse direction of the obtained film and the heat shrinkage rates in the machine and transverse directions over the entire width are within the specified ranges, the film is suitable for various processing applications, but the film is formed from a conventional polyester resin derived from fossil fuels, has a low content of isophthalic acid component, and is thus inferior as an environmentally friendly polyester film.

In Comparative Example 2, the cooling region is not provided before the heat setting treatment region, and the crystallization temperature when heated, heat shrinkage rates in the machine and transverse directions over the entire width, and the content of isophthalic acid component are within the specified ranges, but the amount of change in orientation angle in the transverse direction is large, and thus the film processability is evaluated to be poor.

In Comparative Example 3, the crystallization temperature when heated, amount of change in orientation angle in the transverse direction, and the content of isophthalic acid component in the obtained film are within the specified ranges, but the heat shrinkage rates in the machine and transverse directions over the entire width are outside the specified ranges, dimensional stability against heat is inferior, and thus the film processability is evaluated to be poor.

In Comparative Example 4, since the crystallization temperature when heated, amount of change in orientation angle in the transverse direction, heat shrinkage rates in the machine and transverse directions over the entire width, and the content of isophthalic acid component in the obtained film are within the specified ranges, but the temperature during stretching in the transverse direction is high and fracture is likely to occur during stretching and film formation, a master roll having a wound length of 60,000 m cannot be stably obtained, and is inferior as a film roll that can be continuously produced industrially.

In Comparative Example 5, the crystallization temperature when heated, heat shrinkage rates in the machine and transverse directions over the entire width, and the content of isophthalic acid component are within the specified ranges, but the amount of change in orientation angle in the transverse direction is large, and thus the film processability is evaluated to be poor.

INDUSTRIAL APPLICABILITY

The biaxially oriented polyester film of the present invention can provide a biaxially oriented polyester film that is suitable for various processing applications as there are little variations and distortion in molecular orientation property and heat shrinkage rate in the film transverse direction and the physical properties in the film transverse direction are uniform and is environmentally friendly as polyester resin employing recycled PET bottles is used, and a production method therefor.

Because these may be widely employed in the field of films for packaging use in gas barrier film applications and for food packaging, and because there is strong demand of late for reduction in environmental impact, it is to be expected that they will contribute greatly to the industry.

The invention claimed is:

1. A biaxially oriented polyester film comprising a polyester resin composition containing polyester resin employing recycled PET bottles and particles, wherein the biaxially oriented polyester film meets all of requirements (1) to (4) below:

(1) a crystallization temperature when heated that is measured using a differential scanning calorimeter is 120° C. or more and 139° C. or less;

(2) an amount of change in orientation angle with respect to a film transverse direction is 0° or more and 10° or less per 0.5 m;

(3) a heat shrinkage rate when heat treatment at 150° C. for 30 minutes is performed over an entire width of the film is in a range of 0.5% or more and 2.0% or less in a machine direction and in a range of −1.0% or more and 1.0% or less in a transverse direction; and (4) a content rate of an isophthalic acid component with respect to 100 mol % of total dicarboxylic acid components in the polyester resin composition is 0.01 mol % or more and 3.0 mol % or less, where sample collection positions in the requirements (2) and (3) are a center position with respect to the entire width and positions at intervals of 500 mm from the center position toward both ends, and are end positions where collection is possible in a case where intervals of 500 mm cannot be secured near both ends, and it is required that maximum and minimum values of data for each measurement position is within the range in the requirement (3) and a maximum value of each amount of change between two adjacent sample collection positions is within the range in the requirement (2).

2. The biaxially oriented polyester film according to claim 1, wherein a content rate of the polyester resin employing recycled PET bottles in the polyester resin composition making up the biaxially oriented polyester film is 50 mass % or more and 100 mass % or less.

3. The biaxially oriented polyester film according to claim 1, wherein the polyester resin employing recycled PET bottles is mechanically recycled polyester resin and/or chemically recycled polyester resin.

4. A production method for the biaxially oriented polyester film according to claim 1, the method comprising a polyester raw resin melt extrusion step, a biaxial stretching step, a heat setting treatment step, a thermal relaxation treatment step, and a step of winding a biaxially oriented polyester film into a roll, wherein stretching in a machine direction is performed, then stretching in a transverse direction is performed in a tenter, and a cooling region is provided before a heat setting treatment region in the biaxial stretching step.

* * * * *